United States Patent
Martos et al.

(10) Patent No.: US 12,434,980 B2
(45) Date of Patent: Oct. 7, 2025

(54) PREPARATION OF MAGNETITE NANOPARTICLES AND USES THEREOF

(71) Applicant: University of Guelph, Guelph (CA)

(72) Inventors: Perry Martos, Kitchener (CA); Charles Wroblewski, Guelph (CA); Blake Martos, Kitchener (CA)

(*) Notice: Subject to any disclaimer, the term of this patent is extended or adjusted under 35 U.S.C. 154(b) by 703 days.

(21) Appl. No.: 17/737,510

(22) Filed: May 5, 2022

(65) Prior Publication Data

US 2022/0371912 A1 Nov. 24, 2022

Related U.S. Application Data

(60) Provisional application No. 63/201,655, filed on May 7, 2021.

(30) Foreign Application Priority Data

May 7, 2021 (CA) .................. CA 3117786

(51) Int. Cl.
| | |
|---|---|
| *C01G 49/08* | (2006.01) |
| *B82Y 30/00* | (2011.01) |
| *B82Y 40/00* | (2011.01) |

(52) U.S. Cl.
CPC .............. *C01G 49/08* (2013.01); *B82Y 30/00* (2013.01); *B82Y 40/00* (2013.01); *C01P 2004/64* (2013.01)

(58) Field of Classification Search
CPC ................. C01G 49/08; B82Y 30/00
See application file for complete search history.

(56) References Cited

FOREIGN PATENT DOCUMENTS

CN 102616863 A * 8/2012

OTHER PUBLICATIONS

Wu, W.; Wu, Z.; Yu, T.; Jiang, C.; Kim, W.S. "Recent progress on magnetic iron oxide nanoparticles: Synthesis, surface functional strategies and biomedical applications", Sci. Technol. Adv. Mater. 2015, 16, 23501.
Ahn, T.; Kim, J.H.; Yang, H.M.; Lee, J.W.; Kim, J.D., "Formation pathways of magnetite nanoparticles by coprecipitation method", J. Phys. Chem. C 2012, 116, 6069-6076.
Wu, S.; Sun, A.; Zhai, F.; Wang, J.; Xu, W.; Zhang, Q.; Volinsky, A.A, "Fe3O4 magnetic nanoparticles synthesis from tailings by ultrasonic chemical co-precipitation", Mater. Lett. 2011, 65, 1882-1884.

(Continued)

*Primary Examiner* — Anthony J Zimmer
*Assistant Examiner* — Annette Phan

(57) ABSTRACT

The present application relates to a method of preparing magnetite nanoparticles. In particular, it relates to a method of preparing magnetite ($Fe_3O_4$) nanoparticles wherein a gas-liquid reaction interface between an ammonia gas ($NH_{3(g)}$) headspace and an aqueous ferrous ($Fe^{2+}$) and ferric ($Fe^{3+}$) iron salts solution is established and without agitation magnetite ($Fe_3O_4$) nanoparticles are formed. The present application also includes magnetite nanoparticles prepared by the method and to uses thereof, for example, for extracting one or more analytes from a sample.

20 Claims, 12 Drawing Sheets

(56) References Cited

OTHER PUBLICATIONS

Abou-Hassan, A.; Dufrěchfer, J.F.; Sandre, O.; Mériguet, G.; Bernard, O.; Cabuil, V., "Fluorescence confocal laser scanning microscopy for pH mapping in a coaxial flow microreactor: Application in the synthesis of superparamagnetic nanoparticles", J. Phys. Chem. C 2009, 113, 18097-18105.

Laurent, S.; Forge, D.; Port, M.; Roch, A.; Robic, C.; Elst, L.V.; Muller, R.N., "Magnetic iron oxide nanoparticles: Synthesis, stabilization, vectorization, physicochemical characterizations, and biological applications", Chem. Rev. 2008, 108, 2064-2110.

Tronc, E.; Belleville, P.; Jolivet, J.P.; Livage, J., "Transformation of ferric hydroxide into spinel by Fe(II) adsorption", Langmuir 1992, 8, 313-319.

Jolivet, J.; Chanéac, C.; Tronc, E., "Iron oxide chemistry. From molecular clusters to extended solid networks", Chem. Commun. 2004, 98, 477-483.

Lee, S.J.; Jeong, J.R.; Shin, S.C.; Kim, J.C.; Kim, J.D., "Synthesis and characterization of superparamagnetic maghemite nanoparticles prepared by coprecipitation technique", J. Magn. Magn. Mater. 2004, 282, 147-150.

Mo, Z.; Zhang, C.; Guo, R.; Meng, S.; Zhang, J., "Synthesis of Fe3O4 nanoparticles using controlled ammonia vapor diffusion under ultrasonic irradiation", Ind. Eng. Chem. Res. 2011, 50, 3534-3539.

Mamani, J.B.; Gamarra, L.F.; De Souza Brito, G.E., "Synthesis and characterization of Fe3O4 nanoparticles with perspectives in biomedical applications", Mater. Res. 2014, 17, 542-549.

Habila, M.A.; Alothman, Z.A.; El-Toni, A.M.; Labis, J.P.; Soylak, M., "Synthesis and application of Fe3O4@SiO2@TiO2 for photocatalytic decomposition of organic matrix simultaneously with magnetic solid phase extraction of heavy metals prior to ICP-MS analysis", Talanta 2016, 154, 539-547.

Farrell, D.; Majetich, S.A.; Wilcoxon, J.P., "Preparation and characterization of monodisperse Fe nanoparticles", J. Phys. Chem. B 2003, 107, 11022-11030.

Mourdikoudis, S.; Pallares, R.M.; Thanh, N.T.K., "Characterization techniques for nanoparticles: Comparison and complementarity upon studying nanoparticle properties", Nanoscale 2018, 10, 12871-12934.

Mahdavi, M.; Namvar, F.; Bin Ahmad, M.; Mohamad, R. "Green Biosynthesis and characterization of magnetic iron oxide (Fe3O4) nanoparticles using seaweed (*Sargassum muticum*) aqueous extract", Molecules 2013, 18, 5954-5964.

Silva, V.A.J.; Andrade, P.L.; Silva, M.P.C.; Bustamante, A.D.; De Los Santos Valladares, L.; Albino Aguiar, J., "Synthesis and characterization of Fe3O4 nanoparticles coated with fucan polysaccharides", J. Magn. Magn. Mater. 2013, 343, 138-143.

Alibeigi, S.; Vaezi, M.R., "Phase transformation of iron oxide nanoparticles by varying the molar ratio of Fe2+:Fe3+", Chem. Eng. Technol. 2008, 31, 1591-1596.

Petcharoen, K.; Sirivat, A., "Synthesis and characterization of magnetite nanoparticles via the chemical co-precipitation method", Mater. Sci. Eng. B Solid State Mater. Adv. Technol. 2012, 177, 421-427.

Dar, M.I.; Shivashankar, S.A., "Single crystalline magnetite, maghemite, and hematite nanoparticles with rich coercivity", RSC Adv. 2014, 4, 4105-4113.

Kolen'Ko, Y.V.; Bañobre-López, M.; Rodríguez-Abreu, C.; Carbó-Argibay, E.; Sailsman, A.; Piñeiro-Redondo, Y.; Cerqueira, M.F.; Petrovykh, D.Y.; Kovnir, K.; Lebedev, O.I.; et al., "Large-scale synthesis of colloidal Fe3O4 nanoparticles exhibiting high heating efficiency in magnetic hyperthermia", J. Phys. Chem. C 2014, 118, 8691-8701.

He, X.; Zhong, W.; Au, C.T.; Du, Y., "Size dependence of the magnetic properties of Ni nanoparticles prepared by thermal decomposition method", Nanoscale Res. Lett. 2013, 8, 1-10.

Mascolo, Maria Cristina; Pei, Yongbing; Ring, Terry A., "Room Temperature Co-Precipitation Synthesis of Magnetite Nanoparticles in a Large pH Window with Different Bases", Materials, 2013, 6, 5549-5567.

Wroblewski, Charles; Volford, Tunde; Martos, Blake; Samoluk, Jurek; Martos, Perry, "High Yield Synthesis and Application of Magnetite Nanoparticles (Fe3O4)", Magnetochemistry, May 15, 2020, 6, 22, pp. 1-14.

\* cited by examiner (a)

(b)

(c)

(d)

PREPARATION OF MAGNETITE NANOPARTICLES AND USES THEREOF

RELATED APPLICATIONS

The present application claims the benefit of priority from U.S. provisional patent application No. 63/201,655 filed on May 7, 2021 and from Canadian patent application no. 3,117,786 filed on May 7, 2021, the contents of both of which are incorporated herein by reference in their entirety.

FIELD

The present application related to methods of preparing magnetite particles and to the magnetite particles prepared therefrom.

BACKGROUND OF THE APPLICATION

Magnetite ($Fe_3O_4$) nanoparticles (MNP) are of interest to industry and academia with research and applications in: medicine [1-5], technology [6, 7], bioremediation, and analytical analysis [8-11]. They are often used as a core for surface modification with siloxanes and protein, making them suitable for targeted applications [9, 12-14]. Their surface to volume ratios compared to micron particles are 100 times for 10 nm particles compared to 1000 nm particles. Combined with their inert properties, MNPs are super-paramagnetic, which permit simple removal from systems and applications [8-10].

Co-precipitation is one of the simplest techniques for MNP synthesis. It is typically carried out in aqueous solutions of ferrous ($Fe^{2+}$) and ferric ($Fe^{3+}$), with bulk addition of $OH^-$, with heat and/or agitation and/or sonication. These approaches are required to disrupt crystal growth during MNP synthesis [15]. While simple, issues with impurities from reagents are cumulative: from base, iron salts, water, which can all impact MNP phase purity, quality and changing their composition [16]. In many examples yields are not reported likely because of the synthesis of other iron oxides [17], resulting in the simultaneous nucleation of multiple iron oxides and crystal growth phases for others [18].

Magnetite is one form of iron oxide, others include hematite ($\alpha$-$Fe_2O_3$) and maghemite ($\gamma$-$Fe_2O_3$) [15,19,20]; however, maghemite and hematite are high temperature oxidation products of magnetite. Studies to optimize MNP syntheses include increasing the efficiency and/or approach to $OH^-$ delivery with the reduction in titrant volume ($\mu$L sized volumes) [21, 22].

SUMMARY

The Applicants have developed a high-yield, phase pure method of preparing magnetite ($Fe_3O_4$) nanoparticles (MNPs).

Accordingly, the present application includes a method of preparing magnetite ($Fe_3O_4$) nanoparticles comprising:
  establishing a gas-liquid reaction interface between an ammonia gas ($NH_{3(g)}$) headspace and an aqueous ferrous ($Fe^{2+}$) and ferric ($Fe^{3+}$) iron salts solution having a total iron salts concentration of greater than 1 mM and less than 10 mM, in a reaction vessel; and
  without agitation forming the magnetite ($Fe_3O_4$) nanoparticles.

The present application further comprise magnetite nanoparticles prepared by the method described above.

The present application also includes a method of extracting one or more analytes from a sample comprising:
  contacting magnetite nanoparticles of the application with the sample comprising the one of more analytes under conditions for the magnetite nanoparticles to bind to the one or more analytes to form a complex; and
  separating the complex from the sample to extract the one or more analytes from the sample.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

BRIEF DESCRIPTION OF THE DRAWINGS

The present application will now be described in greater detail with reference to the drawings in which.

DETAILED DESCRIPTION OF THE APPLICATION

I. Definitions

Figure 1:
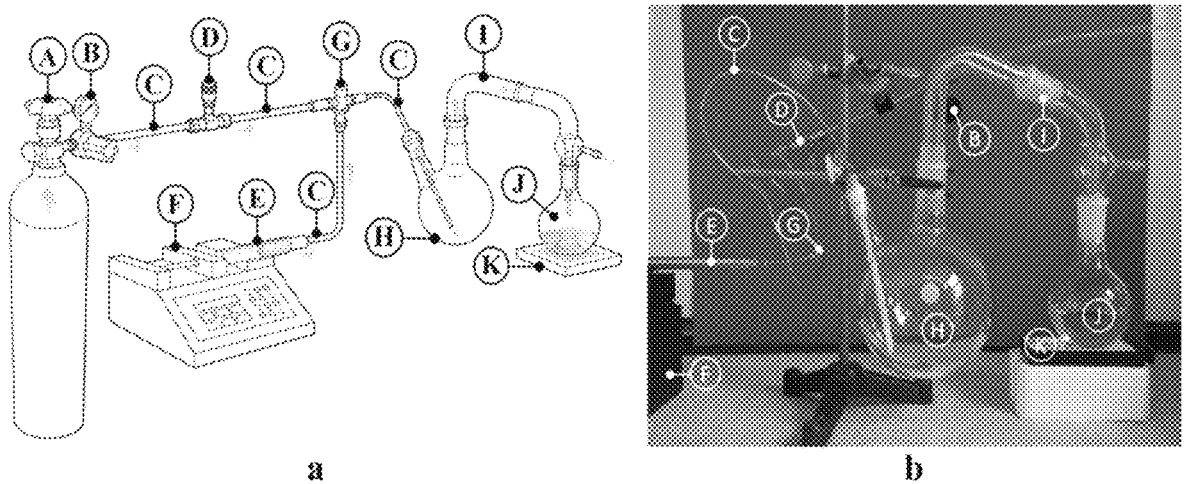
FIG. 1 is a schematic (a) and a photograph (b) of an exemplary system configuration. A: Ultra-high purity (UHP) nitrogen 99.998%, B: single stage regulator set to 100 psi, C: 0.02" stainless-steel tubing, D: fine metering valve E: 2.5 mL stainless steel high pressure gastight syringe (with 25.1% w/v ammonia), F: syringe infusion pump, G: mixing tee (20 µL), H: 1,000 mL round bottom flask, I: vacuum distilling adapter, J: 250 mL flat bottom flask with 100 mL iron salt ($Fe^{2+}$/$Fe^{3+}$) solution, K: permanent neodymium magnet.

Unless otherwise indicated, the definitions and embodiments described in this and other sections are intended to be applicable to all embodiments and aspects of the disclosure herein described for which they are suitable as would be understood by a person skilled in the art.

As used in this application, the singular forms "a", "an" and "the" include plural references unless the content clearly dictates otherwise. For example, an embodiment including "a sample" should be understood to present certain aspects with one sample, or two or more additional sample.

In embodiments comprising an "additional" or "second" component, such as an additional or second catalyst, the second component as used herein is chemically different from the other components or first component. A "third" component is different from the other, first, and second components, and further enumerated or "additional" components are similarly different.

The term "suitable" as used herein means that the selection of the particular compound or conditions would depend on the specific synthetic manipulation to be performed, and the identity of the molecule(s) to be transformed, but the selection would be well within the skill of a person trained in the art. All process/method steps described herein are to be conducted under conditions sufficient to provide the desired product. A person skilled in the art would understand that all reaction conditions, including, for example, reaction solvent, reaction time, reaction temperature, reaction pressure, reactant ratio and whether or not the reaction should be performed under an anhydrous or inert atmosphere, can be varied to optimize the yield of the desired product and it is within their skill to do so.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies or unless the context suggests otherwise to a person skilled in the art.

The term "NTP" as used herein means normal temperature and pressure.

The term "gas-liquid reaction interface" as used herein means the area where the surface of the iron salt solution and the ammonia gas ($NH_{3(g)}$) headspace come into contact.

The term "headspace" as used herein means the volume above a liquid or solid in a vessel.

The term "magnetite nanoparticles of the application" as used herein refers magnetite nanoparticles prepared according to the methods of the application.

II. Methods of the Application

The Applicants have developed a high-yield, phase pure method of preparing magnetite ($Fe_3O_4$) nanoparticles (MNPs). In particular, magnetite nanoparticles were synthesized de novo from ferrous and ferric iron salt solutions (for example, total iron salt concentration of 3.8 mM) using steady-state headspace ammonia gas ($NH_{3(g)}$) at room temperature and pressure, without mechanical agitation, resulting in >99.9% yield of the MNPs. Magnetite nanoparticles were repeatedly synthesized with the high yield (for example, >99.9%), and with average particle sizes of, for example, 12.9 nm±3 nm nanoparticles size distributions were based on enumeration of transmission electron microscopy (TEM) images [23, 24] and chemical compositions analyzed by: inductively coupled plasma mass spectrometry (ICP-MS) [25], energy dispersive X-ray fluorescence (EDXRF) spectroscopy [26, 27], X-ray diffraction (XRD) [28, 29], and Fourier transform infrared spectroscopy (FT-IR) [28,30]. Super-paramagnetic properties were analyzed by magnetization saturation (74 emu/g). The method was studied by varying headspace concentration of $NH_{3(g)}$ (for example, 1.6, 3.3, 8.4% (v/v)), and total iron concentrations (for example, 1.0 mM, 3.8 mM, 10.0 mM, and >>10 mM).

MNPs have been used in the field of biomedicine, for example, as drug carriers in cancer treatment, as magnetic resonance imaging agents, as biosensors, in protein purification and in bioseparation. Generally, surface modification of MNPs has been used to make the MNPs biocompatible. The Applicant have advantageously shown that magnetite nanoparticles produced by the method described herein can be used to selectively extract target analytes such as tetracycline antibiotics from aqueous solutions, without the need for MNP surface modification.

Accordingly, the present application includes a method of preparing magnetite ($Fe_3O_4$) nanoparticles comprising:
establishing a gas-liquid reaction interface between an ammonia gas ($NH_{3(g)}$) headspace and an aqueous ferrous ($Fe^{2+}$) and ferric ($Fe^{3+}$) iron salts solution having a total iron salts concentration of greater than 1 mM and less than 10 mM, in a reaction vessel; and without agitation forming the magnetite ($Fe_3O_4$) nanoparticles.

In an embodiment, the total iron salts concentration is greater than 1 mM to about 9 mM, greater than 1 mM to about 8 mM, greater than 1 mM to about 7 mM, greater than 1 mM to about 6 mM, greater than 1 mM to about 5 mM or greater than 1 mM to about 4 mM. In an embodiment, the total iron salts concentration is greater than 2 mM to about 9 mM, greater than 2 mM to about 8 mM, greater than 2 mM to about 7 mM, greater than 2 mM to about 6 mM, greater than 2 mM to about 5 mM or greater than 2 mM to about 4 mM. In an embodiment, the total iron salts concentration is about 2 mM to about 9 mM, about 2 mM to about 8 mM, about 2 mM to about 7 mM, about 2 mM to about 6 mM, about 2 mM to about 5 mM, about 3 mM to about 5 mM, about 2 mM to about 4 mM, about 3 mM to about 4 mM, or about 3.5 mM to about 4 mM. In an embodiment, the total iron salts concentration about 2 mM to about 5 mM, about 3 mM to about 5 mM, about 2 mM to about 4 mM, about 3 mM to about 4 mM, or about 3.5 mM to about 4 mM. In an embodiment, the total iron salts concentration about 3 mM to about 5 mM, about 3 mM to about 4 mM, or about 3.5 mM to about 4 mM. In an embodiment, the total iron salts concentration is about 3.8 mM.

In an embodiment, the iron salts solution has a molar ratio of 1.75:1 to 2.25:1 ferrous ($Fe^{2+}$) iron salt to ferric ($Fe^{3+}$) iron salt. In an embodiment, the iron salts solution has a molar ratio of 2:1 ferrous ($Fe^{2+}$) iron salt to ferric ($Fe^{3+}$) iron salt.

In an embodiment, the step of establishing the gas-liquid reaction interface comprises delivering ammonia gas ($NH_{3(g)}$) into the headspace of the reaction vessel. In an embodiment, the ammonia gas ($NH_{3(g)}$) headspace is developed by the delivering of the ammonia gas ($NH_{3(g)}$) into the headspace of the reaction vessel. Therefore, in an embodiment, the step of establishing the gas-liquid reaction interface comprises delivering ammonia gas ($NH_{3(g)}$) into the headspace of the reaction vessel and developing an ammonia gas ($NH_{3(g)}$) headspace. Therefore, in an embodiment, the method further comprises delivering ammonia gas into a headspace of a reaction vessel. In an embodiment, the method comprises delivering ammonia gas into a headspace of a reaction vessel and developing an ammonia gas ($NH_{3(g)}$) headspace.

In an embodiment, developing an ammonia gas ($NH_{3(g)}$) headspace means, for example, gradually replacing air (or other gas) in the headspace of the reaction vessel with ammonia gas ($NH_{3(g)}$).

In an embodiment, the ammonia gas is delivered into the headspace at a constant gas flow rate. In an embodiment, the gas flow rate of ammonia gas is about 10 mL/min to about 50 mL/min. In an embodiment, the step of delivering of the ammonia gas into the headspace at a constant rate provides a steady state concentration of ammonia gas in the enclosed headspace. In an embodiment, the ammonia gas is delivered into the headspace using the apparatus shown in FIG. 1. Therefore, in an embodiment, the ammonia gas ($NH_{3(g)}$) headspace comprises a steady state ammonia gas concentration.

In an embodiment, the ammonia gas ($NH_{3(g)}$) headspace comprises a concentration of ammonia gas of about 1.0% (v/v), about 2.0% (v/v), about 3.0% (v/v) about 4.0% (v/v), about 5.0% (v/v), about 6.0% (v/v), about 7.0% (v/v), about 8.0% (v/v), about 9.0% (v/v), about 10% (v/v), about 11% (v/v) or about 12% (v/v). In an embodiment, the ammonia gas ($NH_{3(g)}$) headspace comprises a concentration of the ammonia gas of about 2.0% (v/v), about 3.0% (v/v), about 4.0% (v/v), about 5.0% (v/v), about 6.0% (v/v), about 7.0% (v/v), about 8.0% (v/v), or about 9.0% (v/v). In an embodiment, the ammonia gas ($NH_{3(g)}$) headspace comprises a concentration of ammonia gas of about 1.6% (v/v), about 3.3% (v/v), or about 8.4% (v/v). In an embodiment, the ammonia gas ($NH_{3(g)}$) headspace comprises a concentration of ammonia gas of about 3.3% (v/v).

In an embodiment, ammonia gas in the ammonia gas ($NH_{3(g)}$) headspace diffuses into the iron salts solution at the reaction interface to provide aqueous ammonia in the aqueous solution. In an embodiment, the ammonia gas in the ammonia gas ($NH_{3(g)}$) headspace is in equilibrium with the in aqueous ammonia in the aqueous solution.

In an embodiment, the method of the application is performed without agitation. In an embodiment, without agitation means for example, without mechanical or manual blending, stirring, shaking, vibrating and/or mixing and the like.

Without wishing to be bound by theory, a steady-state concentration of $NH_{3(g)}$ in the headspace of the reaction vessel provides a diffusion and equilibrium controlled concentration of $OH^-$ in solution following diffusion of $NH_3$ gas and equilibrium to $NH_3$ aqueous. If the method of the application is performed without agitation, an interface of high concentration of $OH^-$ is developed. This high concentration of $OH^-$ interface provides unlimited $OH^-$ for reaction with $Fe^{2+}$ and $Fe^{3+}$ to magnetite. Further, as the iron salts react with $OH^-$, the products of reaction diffuse from the interface into high [$H^+$], stopping further reactions while additional $OH^-$ at the interface develops.

In an embodiment, the method is performed without heating. an embodiment, the method is performed at room temperature. Accordingly, in an embodiment, the magnetite nanoparticles are formed at room temperature. In an embodiment, the room temperature is about 16° C. to about 25° C., or about 18° C. to about 25° C.

In an embodiment, the magnetite nanoparticles are formed at the gas-liquid reaction interface. In an embodiment, after forming, the magnetite nanoparticles formed at the gas-liquid interface diffuse into the aqueous solution.

In an embodiment, the method further comprises placing the reaction vessel on a magnet. In an embodiment, the magnet is a high powered magnet. In an embodiment, the magnetite nanoparticles are magnetically drawn from the reaction interface into the aqueous solution. In an embodiment, the magnetite nanoparticles are magnetically drawn from the reaction interface (e.g. region of high [OH−] into the aqueous solution (e.g. region of high [H+]), which stops any further reactions among iron salts, and fixes the sizes of magnetite nanoparticles. In an embodiment, the magnet is a neodymium magnet, an electromagnet or alnico magnet. In an embodiment, the magnet is a neodymium magnet.

In an embodiment, the method of the application forms magnetite nanoparticles in less than about 2 hours, less than about 90 minutes, or less than 60 minutes. In an embodiment, the method of the application forms magnetite nanoparticles in less than about 90 minutes or about 90 minutes.

In an embodiment, the method provides magnetite nanoparticles having an average particle size of about 10 nm to about 20 nm, about 10 nm to about 15 nm, or about 11 nm to about 13 nm. In an embodiment, the method provides magnetite nanoparticles having an average particle size of about 11 nm to about 13 nm. In an embodiment, the method provides magnetite nanoparticles having an average particle size of about 12.9 nm.

In an embodiment, the method provides the magnetite nanoparticles in high yield. In an embodiment, the method provides the magnetite nanoparticles in an overall yield of greater than about 96%, greater than about 97%, greater than about 99%, greater than about 99%, greater than about 99.5% or greater than about 99.9%. In an embodiment, the method provides the magnetite nanoparticles in an overall yield of greater than about 99%, greater than 99.5% or greater than 99.9%. In an embodiment, the method provides the magnetite nanoparticles in an overall yield greater than about 99.9% or about 99.9%.

In an embodiment, the method provides magnetite nanoparticles that are phase pure. In an embodiment, the method provides magnetite nanoparticles that substantially free of any other iron oxides. In an embodiment, the other iron oxides are maghemite ($\gamma$-$Fe_2O_3$), hematite ($\alpha$-$Fe_2O_3$), goethite ($FeO_2H$) or lepidocrocite ($\gamma$-$FeO(OH)$) or combinations thereof.

When used in reference to magnetite nanoparticles, "phase pure" or "substantially free of any other iron oxides" means that the magnetite nanoparticles of the application contain about 20% or less, about 10% or less, about 5% or less, about 2% or less, or about 1% or less of any other iron oxide phases as measured, for example, by energy dispersive X-ray fluorescence (EDXRF), X-ray diffraction (XRD) and/or transmission electron microscopy (TEM). Thus, magnetite nanoparticles described herein as substantially free of any other iron oxides would be understood to comprise greater than about 80% (w/w), greater than about 90% (w/w), greater than about 95% (w/w), greater than about 98% (w/w), or greater than about 99% (w/w) of magnetite nanoparticles. Accordingly, in some embodiments of the invention, the magnetite nanoparticles comprise from about 1% to about 10% (w/w), from about 1% to about 5% (w/w), from about 1% to about 3% (w/w) or less than about 1% (w/w) of one or more other iron oxide phases.

In an embodiment, the method of the application provides magnetite nanoparticles that are stable as a suspension in water stored under an inert gas. In an embodiment, the magnetite nanoparticles are stable as a suspension in water under an inert gas for at least about 1 month, at least about 2 months or at least about 3 months at a temperature of about 3° C. to about 10° C., about 3° C. to about 8° C., about 3° C. to about 6° C. or about 4° C. In an embodiment, the inert gas is nitrogen. In an embodiment, the magnetite nanoparticles are stable as a suspension in water for at least 3 months at a temperature of about 4° C., under nitrogen.

The present application further comprise magnetite nanoparticles prepared by the method described above.

The present application further comprises phase pure magnetite nanoparticles. In an embodiment, the phase pure magnetite particles are prepared by the method described above. In an embodiment, the magnetite nanoparticles comprise greater than about 80% (w/w), greater than about 90% (w/w), greater than about 95% (w/w), greater than about 98% (w/w), or greater than about 99% (w/w) of magnetite nanoparticles. Accordingly, in some embodiments of the invention, the magnetite nanoparticles comprise from about 1% to about 10% (w/w), from about 1% to about 5% (w/w), from about 1% to about 3% (w/w) or less than about 1% (w/w) of one or more other iron oxide phases.

In an embodiment, the magnetite nanoparticles are used without surface modification.

In an embodiment, the magnetite nanoparticles are surface modified. In an embodiment, the surface modification comprises coating the magnetite nanoparticles with organic compounds or inorganic compounds.

In an embodiment, the inorganic compound is silica ($SiO_2$), carbon, a metal, a metal oxide, or a metal sulfide. In an embodiment, the inorganic compound is silica ($SiO_2$). In an embodiment, the metal is gold or silver. In an embodiment, the metal oxide is ZnO, $Al_2O_3$ or $TiO_2$.

In an embodiment, the organic material is a polymer, a small molecule, or a surfactant. In an embodiment, the polymer is polyethylene glycol, polyvinylpyrrolidine (PVP), polyethylenimine, polyacrylic acid, polyvinyl alcohol, dextran, starch, alginate, or polyphenol, or combinations thereof. In an embodiment, the organic compound is coupled to the MNP by a coupling agent. In an embodiment, the coupling agent is a silane.

In an embodiment, the magnetite nanoparticles can be surface modified according to processes known in the art, for example, using the procedures found in Huang et al. *Environ. Sci. Technol.* 2010, 44, 7908-7913. In an embodiment, the surface modification of the magnetite nanoparticles comprises a siloxane coating followed by specific amine functionalization with aminopropyl.

III. Uses of the Application

The magnetite nanoparticles prepared by the method of the application are useful, for example, for the selective extraction of target analytes such as tetracycline antibiotics.

The present application therefore includes a method of extracting one or more analytes from a sample comprising:
contacting magnetite nanoparticles of the application with the sample comprising the one of more analytes under conditions for the magnetite nanoparticles to bind to the one or more analytes to form a complex; and
separating the complex from the sample to extract the one or more analytes from the sample.

In an embodiment, the magnetite nanoparticles are a suspension of magnetite nanoparticles in an aqueous solution.

In an embodiment, the sample is a liquid or a gas. In an embodiment, the sample is a liquid. In an embodiment, the sample is an aqueous solution.

In an embodiment, the one or more analytes is a drug. In an embodiment, the one or more analytes is a small molecule drug. In an embodiment, the small molecule drug is an antibiotic. In an embodiment, the antibiotic is a tetracycline antibiotic. In an embodiment, the tetracycline antibiotic is chlortetracycline, oxytetracycline, tetracycline, demeclocycline, methacycline, doxycycline or minocycline, or combinations thereof. In an embodiment, the tetracycline antibiotic is tetracycline or oxytetracycline.

In an embodiment, the magnetite nanoparticles are a suspension of magnetite nanoparticles in an aqueous solution and the conditions for the magnetite nanoparticles to bind to the one or more analytes to form a complex comprise adding the suspension of magnetite nanoparticles in an aqueous solution to the sample. In an embodiment, the sample is an aqueous solution.

In an embodiment, the conditions for the magnetite nanoparticles to bind to the one or more analytes to form a complex comprise agitating the magnetite nanoparticles and the sample. In an embodiment, the agitating is by manual stirring or mechanical stirring such as vortexing, shaker or static mixer.

In an embodiment, the separating is by any means of separating a solid and a liquid, or a solid and a gas known in the art. In an embodiment, the separating is by decanting, filtering or centrifuging.

In an embodiment, the magnetite nanoparticles of the application are provided without surface modification. In an embodiment, the magnetite nanoparticles of the application are surface modified.

The following non-limiting examples are illustrative of the present application:

EXAMPLES

Example 1: Preparation and Characterization of Magnetite Nanoparticles

Materials and Methods

1. Materials and Instrumentation

Iron(II) chloride $4H_2O$ (99.9%) (MW 198.811, 28.089% $Fe^{2+}$), iron(III) chloride $6H_2O$ (99.9%) (MW 270.294, 20.661% $Fe^{3+}$), iron(II)(III) oxide (magnetic nanoparticle in toluene 10 nm±1 nm), sodium hydroxide (semiconductor grade 99.99%), phenolphthalein, oxytetracycline, tetracycline, and formic acid (>99%) were all purchased from Sigma Aldrich.

Iron(II)(III) oxide $Fe_3O_4$ (97% magnetite nanoparticle 50-100 nm), Optima LC-MS grade water, methanol and ammonia solution (25.1% w/v, 0.91 g/mL), and calcium chloride were purchased from Fisher Scientific. A Sartorius 4 point (Entris 124i) was used, annually re-certified. Ultra-high purity nitrogen (UHP) (99.998%) was purchased from Praxair, Ontario. An inline auxiliary carbon module from Parker Balston P/N B06-0182 was used to purify nitrogen. A precision nickel plated brass ¼" metering valve, stainless steel 1/16" tee and stainless-steel tubing (0.020-inch, 1 m) were purchased from Chromatographic Specialties Inc. A Harvard (PHD 2000) syringe pump to deliver ammonium hydroxide was from Harvard Apparatus, Holliston, Massachusetts.

All glassware including Class A volumetric flasks, and neodymium magnets were purchased from Fisher Scientific. A Gilson auto pipette (5.000 mL±0.0005 mL) from Fisher Scientific. Stainless-steel luer lock needles (17-gauge), compression nuts, ferrules, and stainless-steel mixing tee (20 µL internal volume) were purchased from Chromatographic Specialties Inc., Canada. The 2.5 mL high-pressure stainless-steel syringe with 1/16" Swagelock was purchased from KD Scientific. Gas flow rate measurements were carried out using an HP-1 bubble flow meter (1-50 mL) (Hewlett-Packard) and a Bios Defender 510 Primary Flow Meter (MesaLabs, CO, USA). Volumetric gas flow rates were corrected using barometric pressures acquired from the local airport. Temperatures were measured using a NIST traceable thermometer. A Branson sonicator (VWR) was used. A Cole-Parmer vortex was used.

Samples were imaged on a 200-kV field emission TEM FEI Tecnai G2 F20 fitted with a bottom-mounted Gatan 4K CCD. An Agilent 5110 ICP-OES with a Burgener peek Mira Mist nebulizer and double pass glass cyclonic spray chamber coupled to a ESI SC-DX fast autosampler was used for all ICP-MS analyses. Samples were pressed to disks using a Carver® hydraulic press. A HITACHI S-4500 scanning electron microscope coupled to a Quartz Xone energy dispersive spectrometer was used for EDXRF analysis. A Bruker Tensor 27 FTIR supplied with MCT (mercury, cadmium, telluride) 100-µm detector was cooled with liquid nitrogen with data processed using OPUS Bruker 7.5 software. A Bruker® D8 DISCOVER coupled with a DAVINCI.DESIGN and Vantec 500 (MiKroGap™ technology) area detector was used for XRD analysis, 2D frames were collected with DIFFRAC. Measurement Centre Version 6.5 software and integrated to 1D using DIFFRAC.EVA Version 4.0 (Bruker AXS). A Quantum Design's MPMS 3 SQUID with MPMS 3 MultiVu software was used for data collection. Sciex 5500 LC-MS/MS equipped with a Shimadzu auto sampler, binary UHPLC pump, Nexera XR column oven and Waters C-18 column (2.1×50 mm, 1.7 µm particle size) was used and Analyst 1.6.2 software was utilized for data processing.

Illustrations were developed using Adobe Photoshop (version 12.2.0.385) and photos were acquired with a Canon PowerShot SX60 HS. ImageJ software was used for particle size analysis. Graphical representation of data was prepared in Microsoft® Excel® for Office 365 MSO (16.0.1243.20112) 32-bit).

Mobile phases for LC-MS/MS analysis were: A: Fisher Optima water with 0.1% v/v formic acid and B: Fisher LC-MS grade methanol with 0.1% v/v formic acid.

2. Magnetite Nanoparticle Synthesis 2.1. Chemical Co-Precipitation

Stock solutions of iron salts (iron(II) chloride (0.3 M) and iron(III) chloride (0.6 M)) without correction for Fe mol fraction were prepared separately with the addition of 0.6 g $FeCl_2$ and 1.6 g $FeCl_3$ into a 10-mL volumetric flask then filled to line (water) and inverted 100 times to dissolve.

Working standards of iron salts (iron(II) chloride (30 mM) and iron(III) chloride (60 mM)) were prepared from stocks into a 100-mL volumetric flask then filled to line (water) and inverted 100 times; the solution was transferred to a 1000-mL round bottom flask with angled side neck with septum; UHP nitrogen gas was used to purge the solution and headspace (50 mL/min) for 30 min.

A solution of sodium hydroxide (0.4 M) was prepared by the addition of 8 g NaOH into a 500-mL volumetric flask then filled to line (water) and inverted 100 times to dissolve. A total of 25 mL of $NaOH_{(aq)}$ was added to the iron salt solution at a rate of 200 µL/min.

2.2. Iron Salts Solutions ($F^{2+}$ and $Fe^{3+}$)

Stock solutions of iron salts (iron(II) chloride (75 mM $Fe^{2+}$) and iron(III) chloride (55 mM $Fe^{3+}$)) were prepared prior to each experiment with the addition of 150 mg of each salt into separate 10 mL volumetric flasks, filled to line with water, and inverted 100 times to dissolve.

Working solution mixtures of iron salts were prepared with varying concentrations (3.8 mM, and 10 mM) for 2:1 mol:mol $Fe^{2+}:Fe^3$ ratio in 100 mL volumetric flasks. These solutions were transferred to a 250 mL reaction vessel without nitrogen purging.

2.3. Steady State [$NH_{3(g)}$]

Figure 11:
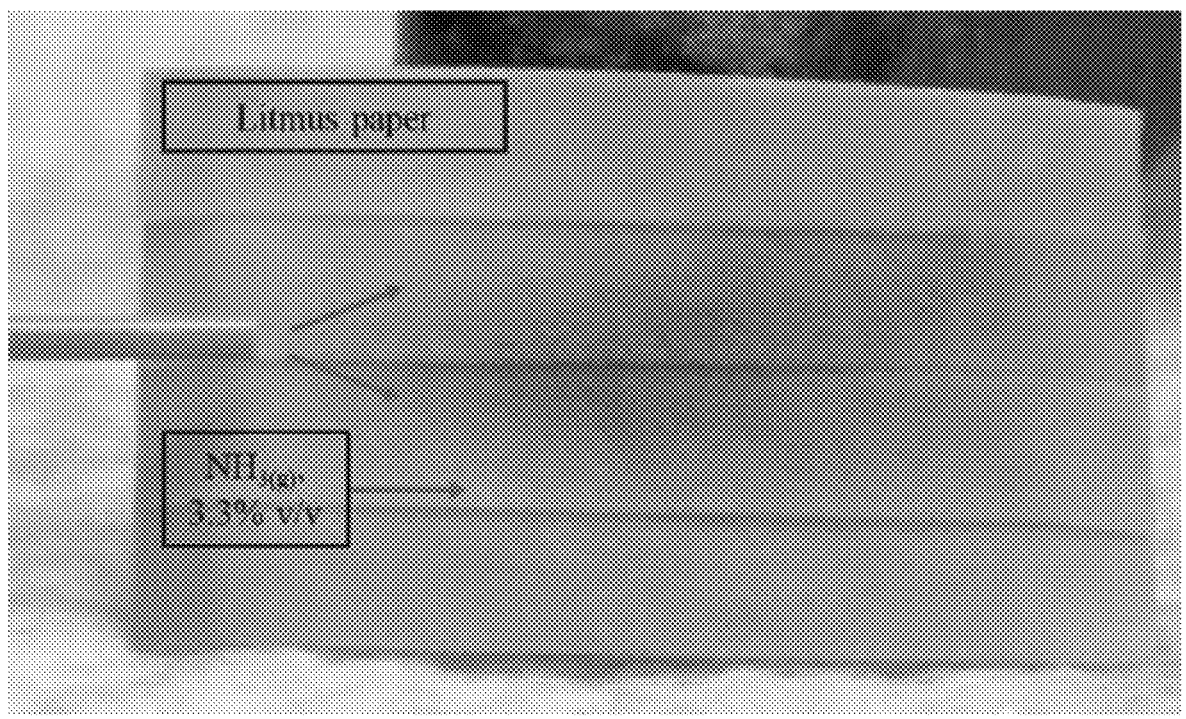
FIG. 11 shows ammonia gas ($NH_{3(g)}$) (3.3% v/v, 25 mL/min (NTP) makeup with $N_2$) sprayed over wet litmus paper.
Figure 12:
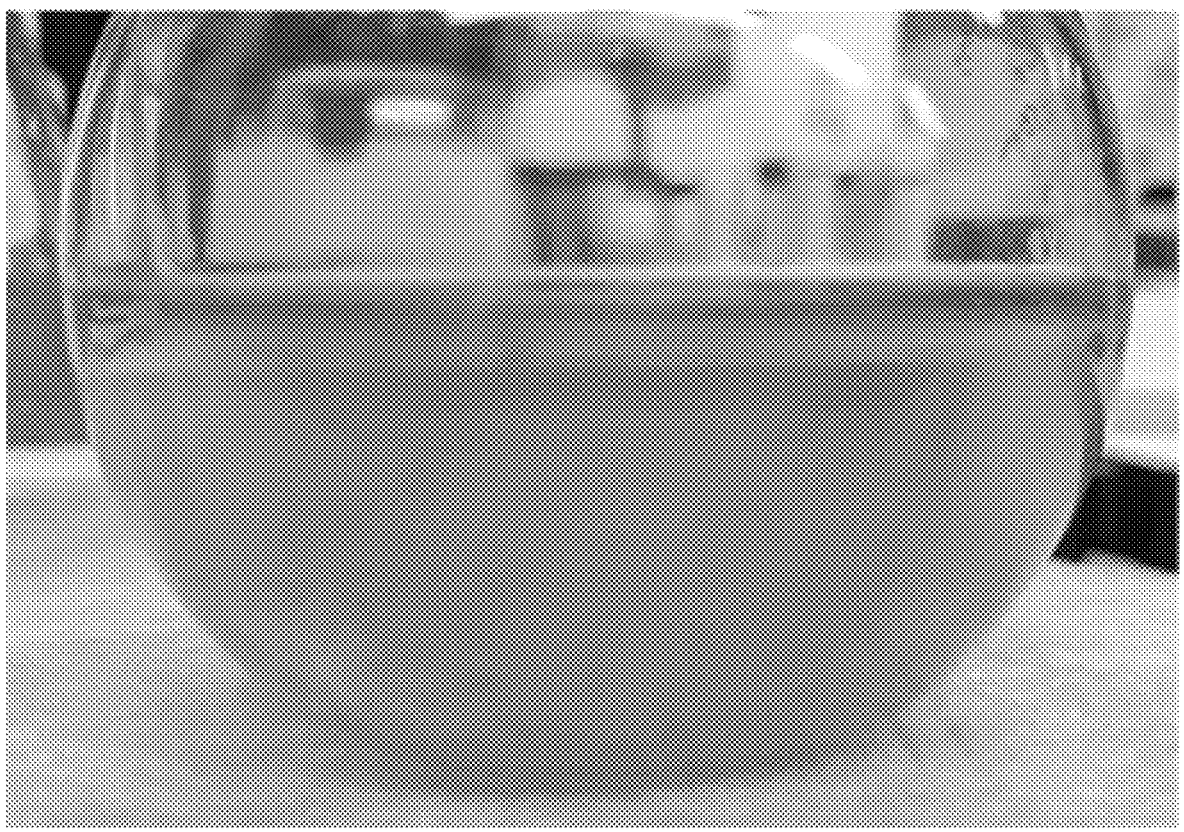
FIG. 12 show synthesis of iron oxide from an iron salt solution (1.0 mM ΣFe and 2:1 $Fe_{2+}:Fe_{3+}$) with 3.3% (v/v) $NH_{3(g)}$.

Steady state [$NH_{3(g)}$] was developed using $NH_{3(aq)}$ delivered at constant rate into a gas diluent at specific flow rates. Ammonia was transferred from the solvent bottle into a sealed vial, from which an aliquot was removed with a stainless-steel syringe for the syringe pump. A syringe pump was set to 2.5 µL/min, to deliver $NH_{3(aq)}$ at a constant rate of 9.52×10$^{-6}$ g/s (Equation (1)) into a stainless steel tee; accuracy was confirmed with water, 2.5 µL/min, delivered to fill a 1.00 mL-volumetric flask to line, which took 400 min at 22° C., adjusting for density. Headspace concentrations of $NH_{3(g)}$ (1.6, 3.3, and 8.4% v/v) (3.3% v/v shown in Equation (2)) were developed with the flow rate-controlled diluent nitrogen gas stream (10 to 50 mL/min, NTP). Gas flow rate deliveries were measured at the terminal points of the stainless-steel tubing post mixing and at the vent. Ammonia gas stream was demonstrated with pre-wet litmus paper showing no droplets or sputtering of ammonia (FIG. 11).

$$\frac{2.5 \mu L}{min} \times \frac{mL}{1000 \ \mu L} \times \frac{0.91 \ g}{mL} \times 25.1\% \times \frac{min}{60 \ s} = 9.517 \times 10^{-6} g/s \quad (1)$$

$$\frac{\frac{9.517 \times 10^{-6} \ g}{s} \times \frac{60 \ s}{min} \times \frac{1000 \ mL}{L} \times \frac{mol}{17.0 \ g} \times \frac{0.0820578 \ L \ atm}{mol \ K} \times \frac{1}{atm} \times 295.15 \ K}{\frac{25 \ mL}{min}} = 3.3\% \ v/v \quad (2)$$

2.4. Apparatus

FIG. 1 shows a schematic (a) and a photograph (b) of an exemplary system configuration. Connection points were tested for leaks using prewet litmus paper following system equilibration with $NH_{3(g)}$; displacement of >99% of air in the headspace was realized after two exchanges (112 min), with 25 mL/min into approximately 1.4 L (exchange is estimated at 56 min ((1400 mL)/((25 mL)/min))). Magnetite nanoparticle synthesis was studied with independent variation of $NH_{3(g)}$ headspace concentrations (see Materials and Methods 2.3. described above) and iron salt solutions (see Materials and Methods 2.2. described above). Following synthesis, the reaction was removed from the apparatus and aggregated with shaking for 30 s. Synthesized particles were stored at room temperature in the reaction vessel sealed with parafilm.

3. Material Analyses 3.1. Preparation of Exemplary Magnetite Nanoparticles for Analyses Exemplary magnetite nanoparticle suspensions (100 mL) were vortexed at half max speed (30 s); aliquots (5 mL) were withdrawn (<30 s) from the middle of the synthesis suspension and dispensed into weight boats. Additionally suspensions were dispensed into clean glass vessels and magnetically separated (20 min); aqueous fraction were decanted and stored for downstream application while nanoparticles were resuspended in water (to volume) by vortex (30 s) and magnetically separated as before for five volume exchanges then transferred to weight boats. All samples were placed in desiccators at room temperature over a bed of $CaCl_2$), to constant weight. Dried nanoparticles were transferred to glass vials, sealed and stored in the desiccator.

3.2. TEM

Exemplary magnetite nanoparticle suspensions (100 mL) were vortexed at half max speed (30 s), subsamples (1 µL) were withdrawn immediately (<30 s) from the middle of the vessel. Samples were dispensed onto 200-mesh copper TEM grids coated in formvar and carbon; suspensions were allowed to air dry for 5 min prior to imaging. Grids were systematically examined with representative images taken at various magnifications with reference bars corresponding to 100, 50 and 20 nm.

3.3. Particle Size Analyses

Exemplary magnetite nanoparticle size distributions were estimated for replicated TEM images (20 nm scale); particles boundaries outlined in ImageJ provided surface area ($nm^2$) and particle diameter (nm) was back calculated assuming a spherical shape. Particle sizes were binned developing frequency distributions according to Excel histogram calculations. Independent two analyst verification was carried out for all TEMs along with image interpretation competency assessed against commercially available nanoparticles.

3.4. ICP-MS Analyses of Aqueous Fraction

Aqueous fractions of replicate synthesis (n=4) were prepared (see, Materials and Methods 3.1. as described) and analyzed without digestion; sample injections (1 mL) were bracketed with standard metal mixes (ppb to ppm) and blanks. Results were reported for iron.

3.5. EDXRF

Iron oxides and dried nanoparticles (≈100 mg) (see, Materials and Methods 3.1. as described above) were individually compressed (8 tons) into disks with a thickness of at least 1 mm and transferred onto double-sided carbon tape for analysis. Examination of surface homogeneity was carried out under magnification (1000×) where representative emission spectra were developed with 20 keV accelerating voltage and emission at 20 µA at a 20 mm working distance and 150 s scanning time.

In comparing samples; narrow distribution (±0.4%) of replicate measurements was reflective of compression to 1 mm which ensured infinite thickness removing bias of x-ray beam penetration and florescence escape depth.

3.6. FT-IR

Iron oxides and dried nanoparticles (≈20 mg, n=2) (see, Materials and Methods 3.1. described above) were individually homogenized (≈2% w/w) with KBr spectrograde powder using a mortar and pestle and compressed (8 tons) into pellets with powder (≈300 mg) evenly distributed in the die. Liquid nitrogen was added to the MTC 100 µm detector prior to sample analysis (30 min) with set resolution of 4 $cm^{-1}$ and 16 scans across a range of 4000-400 $cm^{-1}$; blank KBr pellets were analyzed prior to sample spectra acquisition for subtraction of background.

3.7. XRD

Dried nanoparticle powder (≈100 mg n=2) (see, Materials and Methods 3.1. described above) were transferred from glass vials directly onto sample holding mounts (silica wafers). A cobalt sealed tube source (λavg=1.79026 Å) was set to 35 kV, and 45 mA; diffraction patterns (6 frames) were collected for coupled θ/2θ set to 600 s/frame across 10-100° 2θ fixed at 20 cm from the area detector. 2D fames were integrated to 1D and compared to reference library patterns. Following analysis nanoparticles were collected from holding mounts into inverted weight boat with magnets and transferred back into glass vials for analysis with orthogonal methods.

3.8. Magnetization Saturation

Iron oxide and dried nanoparticle powders (n=2) were weighed out (1-7 mg±0.02 mg) with bracketing check weights into sample holders. Analysis was carried out covering a magnetic field range of −30 to +30 kOe with uniformity over 4 cm of 0.01% and a charging resolution of 0.33 Oe.

3.9. Extraction of Tetracyclines with Magnetite Nanoparticles

Stock solutions of oxytetracycline (OTC) (1000 ppm) and tetracycline (TC) (1000 ppm) were prepared with the addition of 100 mg each to separate volumetric flasks (10 mL), filing to line (water) and inverting 100 times to dissolve. Intermediate standards of 150 ppm were prepared from stocks with the protocol as described above. Calibration curves of OTC and TC mixtures were prepared separately in water and aqueous fraction (see, Materials and Methods 3.1. described above) to concentration of 50, 100, 200, 300, and 400 ppb in vial (1 mL, n=4). All samples were analyzed in random order with LC-MS/MS. Following analysis suspended iron oxide nanoparticles (100 µL) were added to calibration curves developed in aqueous fraction; vials were vortexed for thirty seconds, then placed on a permanent magnet for five minutes. Samples (without further cleanup) were transferred to new vials, capped and directly analyzed by LC-MS/MS. Individual solutions of OTC (200 ppb) and TC (200 ppb) and solvent blanks were used as controls.

Transitions ([M+H]$^+$) for oxytetracycline (OTC): 461>426, 461>443, and tetracycline (TC): 445>410, 445>154. Chromatographic conditions: flow rate of 250 µL/min starting at 1% B (1 min), 10% B/min (9.9 min) 100% B (5 min), injection volume 1.0 µL, and column temperature 25° C.

Results and Discussion 2.1. Apparatus

Figure 2:
FIG. 2 shows $NH_{3(g)}$ (3.3% v/v) headspace and aqueous iron salts solution with phenolphthalein indicator dye (0.001%) after 2 min (arrow). Phenolphthalein indicator dye is colorless <pH 8.2 and pink/red >pH 8.2.

FIG. 1 presents a diagram and photograph of an exemplary apparatus developed for the method of preparing magnetite nanoparticles (MNP) using $NH_{3(g)}$ headspace and iron salts ($Fe^{2+}$, $Fe^{3+}$) solution, described herein in Vessel J. The apparatus is described in detail in the Materials and Methods 2.4 described above. With the apparatus, a steady-state concentration of $NH_{3(g)}$ is delivered into Vessel J, which results in a diffusion and equilibrium controlled [OH$^-$] in solution following diffusion of $NH_{3(g)}$ and equilibrium to $NH_{3(aq)}$ (Equation (3) and FIG. 2). The mass flow rate-controlled delivery of $NH_{3(g)}$ into Vessel J is calculated with Equation (1), with [$NH_{3(g)}$] using Equation (2). The [$NH_{3(aq)}$] is proportional to [$NH_{3(g)}$], and is in part described with Henry's constant, 59 M/atm (NTP)$^{33}$, and is observed as an interface in water with phenolphthalein indicator dye, FIG. 2. If the aqueous layer is not agitated, an interface of high [OH$^-$] is developed. This uniform high [OH$^-$] interface (~55 cm$^2$) provides unlimited OH$^-$ for reaction with $Fe^{2+}$ and $Fe^{3+}$ to magnetite. The reaction interface also defines the region between high [OH] and high [H$^+$]. As iron salts react with OH and the products of reaction diffuse from the interface into high [H$^+$], stopping further reactions [15], additional OH$^-$ at the interface is developed following LeChatelier's principle, Equation (3). The equilibrium favors diffusion of $NH_{3(g)}$ to the aqueous phase of the interface, which results in additional OH$^-$ diffusion into the reaction interface.

$$NH_{3(g)} \underset{(T,P)}{\rightleftharpoons} NH_{3(aq)} + nH_2O \rightleftharpoons NH^+_{4(aq)} + OH^- + n-H_2O \quad (3)$$

Figure 3:
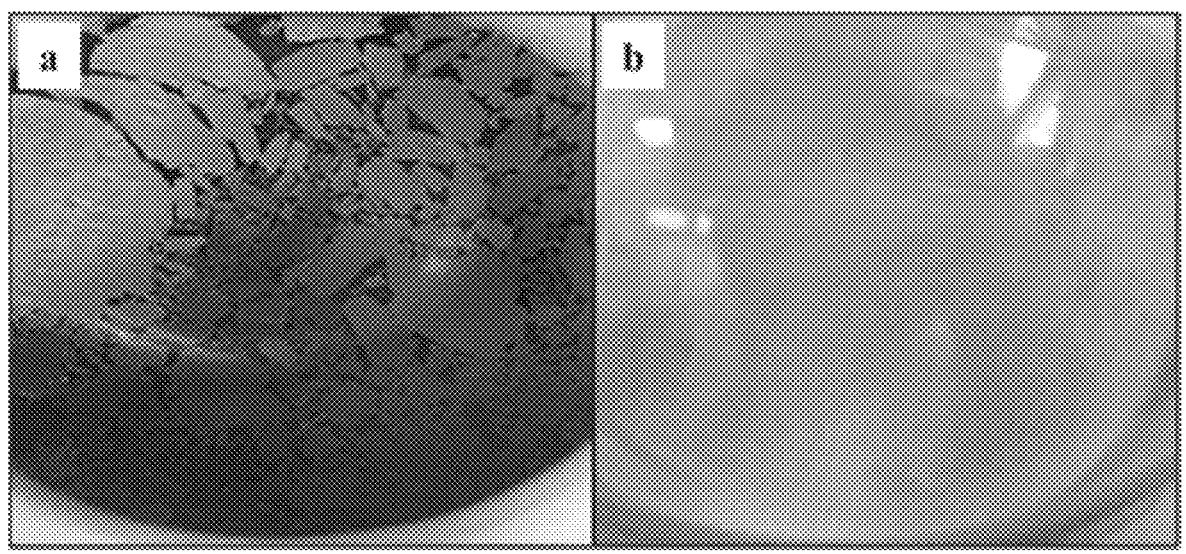
FIG. 3 shows the interface of $NH_{3(g)}$ (3.3% v/v) headspace and iron salts solution (2:1 $Fe^{2+}$:$Fe^{3+}$) for (a) comparative total iron concentration 10 mM and (b) exemplary total iron concentration 3.8 mM.

Solutions of iron salts (2:1, mol:mol, $Fe^{2+}$:$Fe^{3+}$) [31], in equilibrium with steady-state [$NH_{3(g)}$] headspace, underwent color changes from clear and light yellow to black; this was the result of the reaction among the reagents forming magnetite nanoparticles, which are black (Equation (4)). Studies of total concentrations of ferrous and ferric ranged from 10 mM and greater to molar (M), which all resulted in very low MNP yields, less than a few percent. Under these conditions, sheets of iron oxides at the iron salts solution surface at were observed (FIG. 3 a), which resulted in a physical barrier to $NH_{3(g)}$ diffusion to the bulk solution of iron salts, preventing further reactions to MNP. Reducing total iron concentrations to about 3.8 mM, FIG. 3 b, resulted in controlled MNP synthesis with ferrous and ferric ions and OH$^-$ from $NH_{3(g)}$ in equilibrium with aqueous (Equation (3)). This resulted in visible discrete streams of MNPs at the reaction interface which were drawn from the reaction interface through the bulk solution.

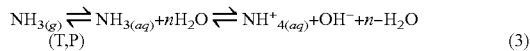

$$2Fe^{2+} + Fe^{3+} + 8OH^- \rightarrow Fe_3O_{4(s)} \quad (4)$$

Magnetite synthesis was observed at the interface (FIG. 4 a) within 2 min following equilibrium development with steady-state $NH_{3(g)}$ headspace. Magnetic particles were magnetically drawn from that interface, into the high [H+] bulk solution (FIG. 4 b), terminating particle growth [15].

The suspension was black within 90 min (times for complete synthesis were approximately 90 min, regardless of [$NH_{3(g)}$] headspace studied) (FIG. 4 c), after which Vessel J was removed from the apparatus, lightly swirled, and a neodymium magnet was placed on the vessel wall. The suspension was stable for at least 3 months at 4° C., under nitrogen. The clear aqueous fraction, (FIG. 4 d), pH ~6 to 7, was analyzed using ICP-MS. Post synthesis, residual iron concentrations were 42±18 ppb, compared to 210 ppm initial, which was >99.9% reaction of the iron salts.

Figure 5:
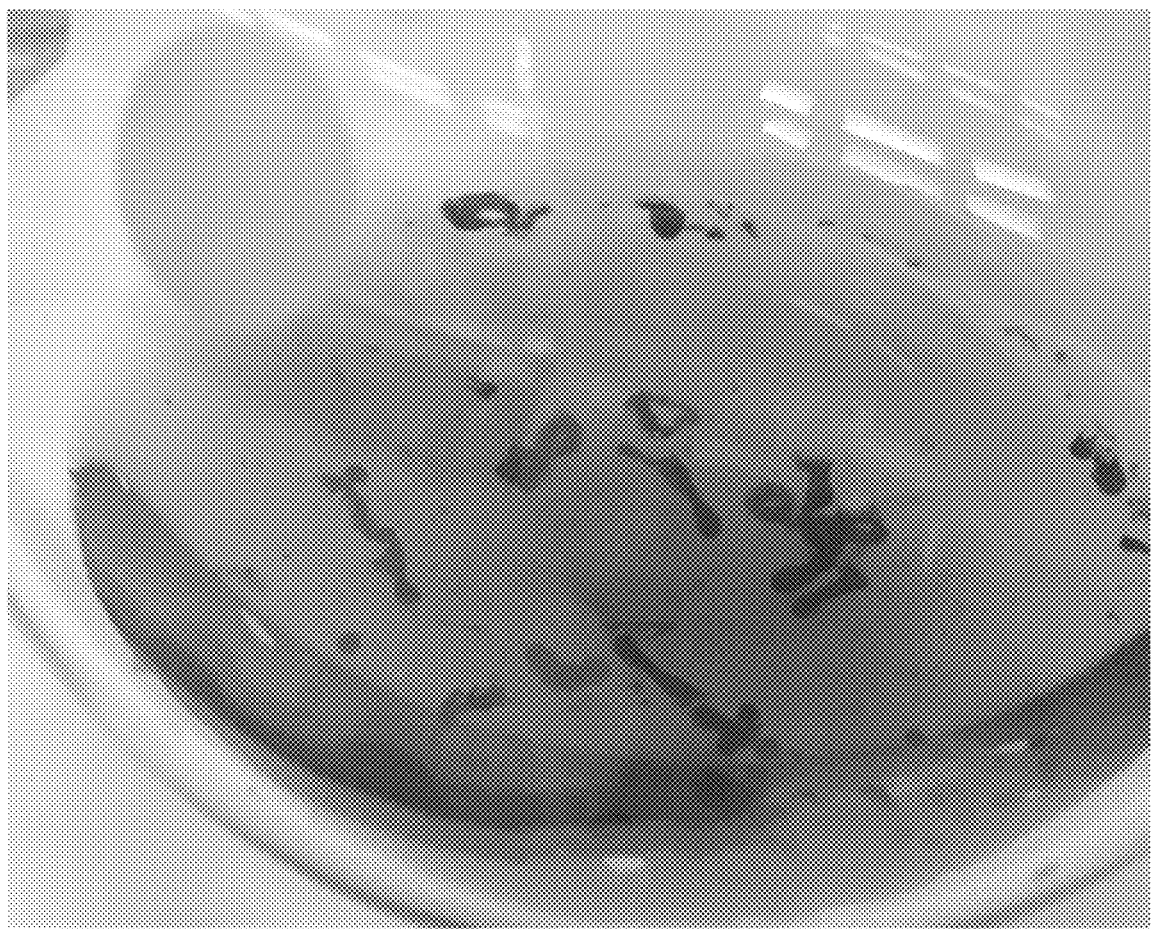
FIG. 5 shows iron oxide clumps observed during synthesis using conventional chemical coprecipitation comprising the addition of 0.4 M $NaOH_{(aq)}$ to an iron salt solution (90 mM $\Sigma$Fe).

Observation of issues with direct base titration of $Fe^{2+}$, $Fe^{3+}$ solutions pointed to a reaction rate issue where the velocity of $Fe_3O_4$ synthesis was maximal, leading to the observed formation of iron oxide clumps of crystals, FIG. 5. Conventional chemical coprecipitation, for the purpose of maximizing MNP mass output, includes molar concentrations of $Fe^{2+}$, $Fe^{3+}$, and OH$^-$ [31]. Equation (5) describes the velocity of $Fe_3O_4$ formation (from Equation (4)), which is maximal when concentrations of $Fe^{2+}$, $Fe^{3+}$, and OH$^-$ are similar. But it is under these conditions that lead to the observed issues shown in FIG. 5.

$$v = k[Fe^{2+}]^2[Fe^{3+}][OH^-]^8 \quad (5)$$

Figure 6:
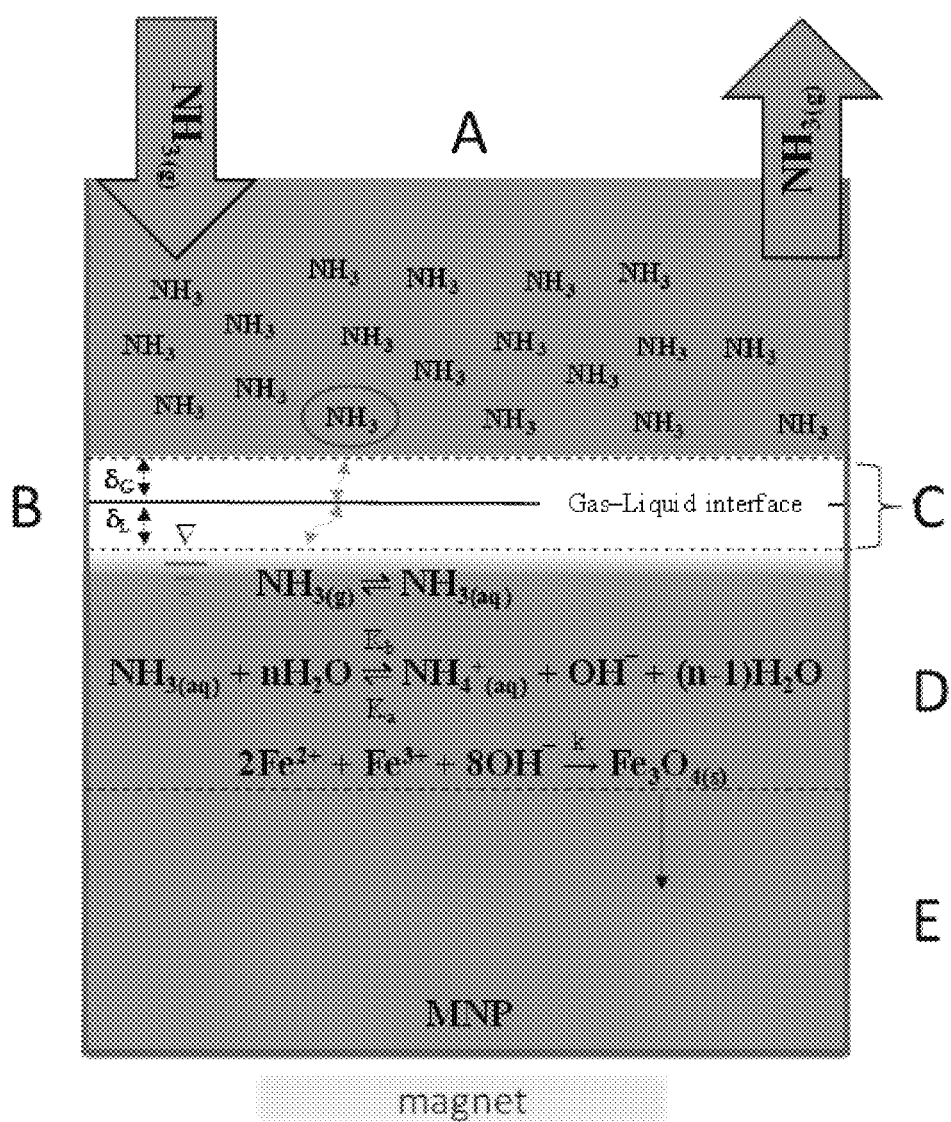
FIG. 6 is an illustration of exemplary magnetite ($Fe_3O_4$) nanoparticles (MNP) synthesis of the application comprising for example, 3.8 mM $\Sigma$Fe and 2:1 $Fe^{2+}$:$Fe^{3+}$ with $NH_{3(g)}$. Where: A is the steady state headspace of $NH_{3(g)}$ at steady state at 1.6% v/v to 8.2% v/v and 50 to 10 sccm, B is the rate constant $K_H$=59 M/atm (NDP), C shows the two-film theory, D is the reaction interface (not scaled) showing high $OH^-$ and, E is the bulk solution of $Fe^{2+}$, $Fe^{3+}$, the iron ions diffuse to the reaction interface.

Sonication and agitation were required to disrupt the iron oxide and realize MNPs. Pure MNP synthesis and high yield are rarely discussed in literature. In order to minimize the phenomenon observed in FIG. 5, researchers have attempted to decrease the droplet size of base titrant [21,22], still with limited success for MNP synthesis yield and mass. It was apparent from Equation (3) that when [OH$^-$]>>[$Fe^{2+}$]+[$Fe^{3+}$] and when d[OH$^-$]/dt=0, i.e., steady-state for OH$^-$, that the rate of $Fe_3O_4$ formation would be dependent on the concentrations of [$Fe^{2+}$]+[$Fe^{3+}$]. This led to the consideration of studying mM concentrations of total [$Fe^{2+}$]+[$Fe^{3+}$], rather than M concentrations. The development of steady-state [OH$^-$], using steady-state ammonia gas generation system as the headspace as described herein and shown in FIG. 6 satisfied these reaction conditions.

Figure 4:
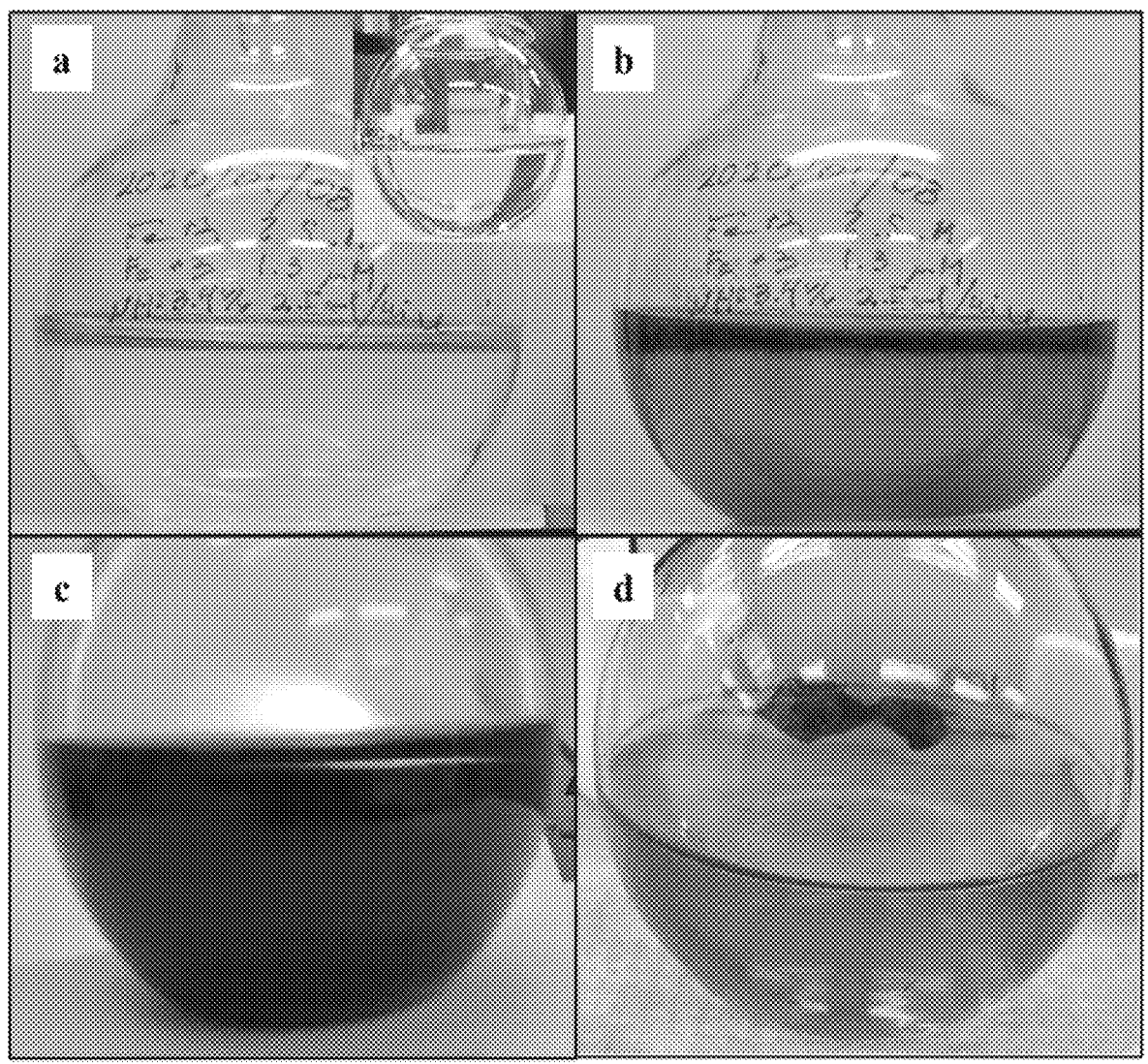
FIG. 4 shows synthesis progression of an exemplary iron salt solution comprising 3.8 mM $\Sigma$Fe and 2:1 $Fe^{2+}$:$Fe^{3+}$ with 3.3% (v/v) $NH_{3(g)}$ after (a) 2 min, insert photo is starting $Fe^{2+}$:$Fe^{3+}$ salt solution, (b) after 15 min, (c) at 90 min, and (d) exemplary magnetite nanoparticles drawn to the magnet on the side of reaction vessel. Diffusion coefficients for $Fe^{2+}$ and $Fe^{3+}$ are $7.19 \times 10^{-6}$ $cm^2/s$ and $6.04 \times 10^{-6}$ $cm^2/s$ (NTP), respectively, and is $52.7 \times 10^{-6}$ $cm^2/s$ for $OH^-$ [35]

While not wishing to be bound by theory, it may be predicted under these reaction conditions, with [OH$^-$]>>[$Fe^{2+}$]+[$Fe^{3+}$], that the reaction will not be dependent on [OH$^-$], which is shown below. Considering Le Chatelier's principle, reaction of interfacial OH$^-$ with $Fe^{2+}$ and $Fe^{3+}$ results in additional OH$^-$ from $NH_{3(g)}$ to $NH_4^+OH^-$. The chemical potential for iron ion reactions therefore is maximal. It is assumed that the velocity of the reaction is, under these conditions, dependent on rate of diffusion of iron ions from the bulk solution to the reaction interface, with D $Fe^{2+}$=7.19×10$^{-6}$ cm$^2$/s and D $Fe^{3+}$=6.04×10$^{-6}$ cm$^2$/s (NTP), and with a concentration gradient of iron ions from the bulk solution to the reaction interface. As the reaction proceeds, decreasing concentrations of iron further decrease the velocity of $Fe_3O_4$ synthesis, until essentially all iron ions have reacted. Nucleation and growth of magnetite is realized in the reaction interface, with termination once the particle is no longer neutrally buoyant, and settles into the region of high H$^+$ (FIG. 4 b).

Controlled experiments to quantify this can be carried out which involve subsampling from the reaction interface and from the bulk solution of iron ions, with analysis using ICP-MS. Additionally, further understanding of the reaction interface can be carried out using cross flow synthesis systems, with discrete mixing chambers, using real-time particle analysis detection.

2.2. Material Analyses

The EDXRF spectrum of exemplary synthesized nanoparticles show elemental emission corresponding to iron, 0.7, 6.4, 7.1 keV and oxygen, 0.5 keV (FIG. 7 a), resulting with the elemental composition of Fe, 72.6%±0.4% and O, 27.4%±0.4%. Elemental composition analyses were confirmed using reference $Fe_3O_4$ nanoparticles (50-100 nm), with the elemental composition of Fe, 72.4% and O, 27.6%. The calculated concentrations of Fe and O suggest composition of 3Fe to 4O and within one standard deviation are highly consistent with magnetite.

Figure 7:
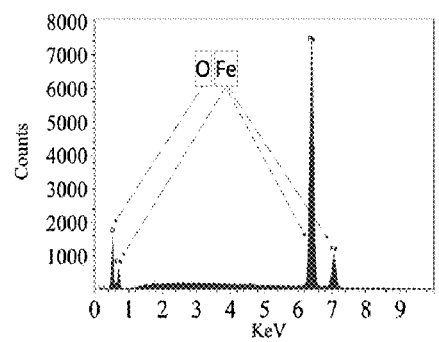
FIG. 7 are graphs showing the analysis of exemplary powdered synthesized nanoparticles by: (a) energy dispersive X-ray fluorescence (EDXRF); (b) Fourier transform infrared spectroscopy (FTIR); (c) X-ray diffraction (XRD) with overlay from reference library as vertical bars; (d) magnetization saturation.
Figure 7:
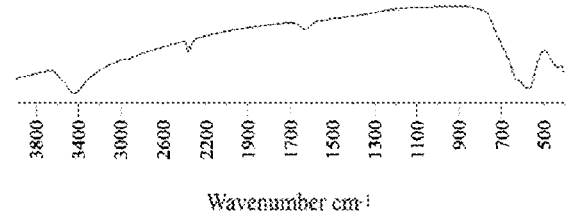
Figure 7:
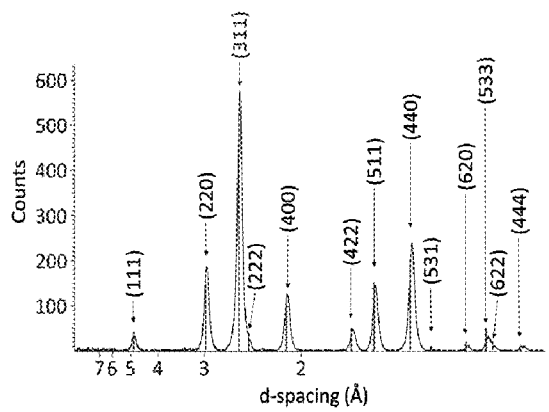
Figure 7:
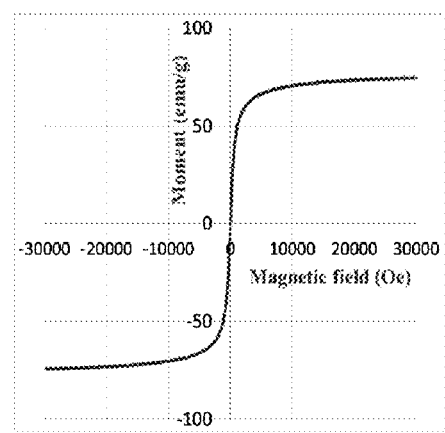

FIG. 7 b shows an FT-IR spectrum for exemplary synthesized nanoparticles. Absorption at 580 $cm^{-1}$, 1630 $cm^{-1}$, 2350-2400 $cm^{-1}$, and 3435 $cm^{-1}$ were observed, consistent with literature [22,32]. Absorption at 580 $cm^{-1}$ agrees with theoretically calculated vibrational frequencies for Fe—O, ca. 545-600 $cm^{-1}$ [33].

Diffraction patterns of exemplary synthesized nanoparticles (FIG. 7 c) are: d-spacing: 4.85, 2.97, 2.53, 2.42, 2.10, 1.71, 1.62, 1.48, 1.42, 1.33, 1.28, 1.27, 1.21 corresponding to Miller indices of the crystal planes: (111), (220), (311), (222), (400), (422), (511), (440), (531), (620), and (444). Reference magnetite ($Fe_3O_4$) from the Joint Committee on Powder Diffraction Standards (JCPDS PDF 00-019-0629) is shown as an overlap with vertical bars. These results strongly suggest a single phase of polycrystalline magnetite ($Fe_3O_4$). Estimated crystallite sizes uses the Scherrer equation, with the result being in the order of 11 nm diameter, but this is not actually a reflection of particle size. This was considering 35 to 50 degrees, $2\theta$, FWHM=1 $2\theta$, and K=1, with $\lambda$=1.78 Å. The absence of three diffraction patterns for (110), (210), and (211), with d-spacings of 5 to 3 exclude maghemite ($\gamma$-$Fe_2O_3$) and other common iron oxides such as hematite ($\alpha$-$Fe_2O_3$) and goethite ($FeO_2H$) [29, 34].

FIG. 7 d shows a typical magnetization saturation curve for exemplary synthesized nanoparticles, without hysteresis, which indicates these nanoparticles are super-paramagnetic. Typical magnetization saturation values were in the range 71-75 emu/g. Reference standard magnetite nanoparticles, 50 to 100 nm, show magnetization saturation of 99 emu/g (data not shown). Observation of lower magnetization saturation for the exemplary synthesized nanoparticles is highly consistent with magnetite nanoparticles, given a decreased magnetization saturation is observed as the surface properties particles become more significant with decreasing particle sizes [35, 36].

Figure 8:
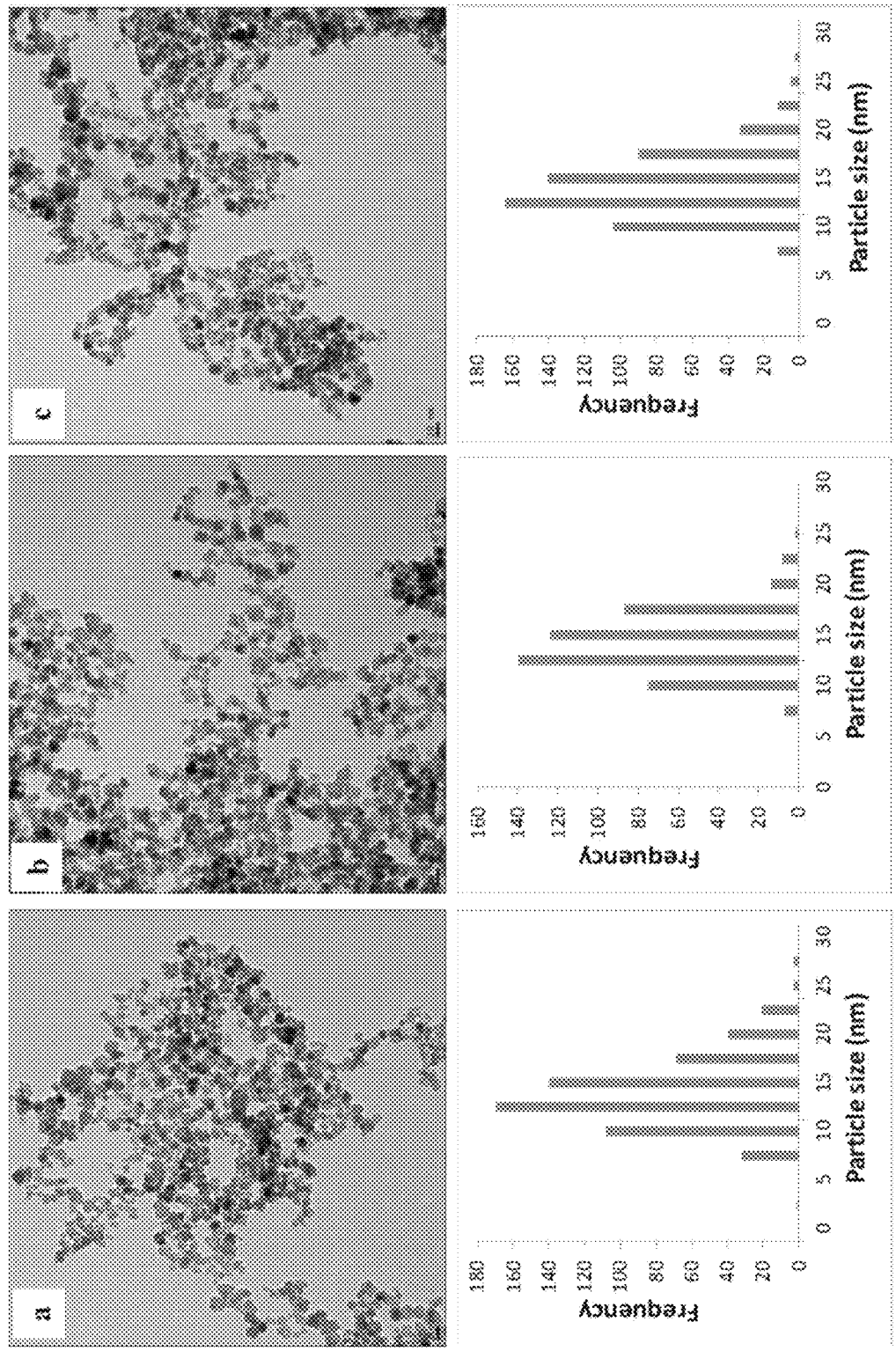
FIG. 8 shows transmission electron microscopy (TEM) diagrams of exemplary magnetite nanoparticles (20 nm reference bar) synthesized from an exemplary iron salt solution comprising 3.8 mM and 2:1 $Fe^{2+}:Fe^{3+}$ with varying steady-state headspace concentrations of $NH_{3(g)}$, % v/v, for example, (a) 1.6, (b) 3.3, and (c) 8.4.

Representative, replicate analyses of TEMs, (FIG. 8) for 3.8 mM total $Fe^{2+}$:$Fe^{3+}$ with variable [$NH_{3(g)}$] headspace demonstrated repeatable MNP syntheses; TEMs among analysts were also compared, and over time, with no distinguishable differences based on particle shapes and sizes (Table 1). Incomplete synthesis products, such as lepidocrocite, goethite, and hematite [15,19,20] were not observed in any TEMs.

There was no impact on particle size distributions and descriptive statistical analyses with varying [$NH_{3(g)}$] headspace. All frequency distributions were normal with a slight positive skew.

2.3. MNP Extraction of Tetracyclines

Figure 9:
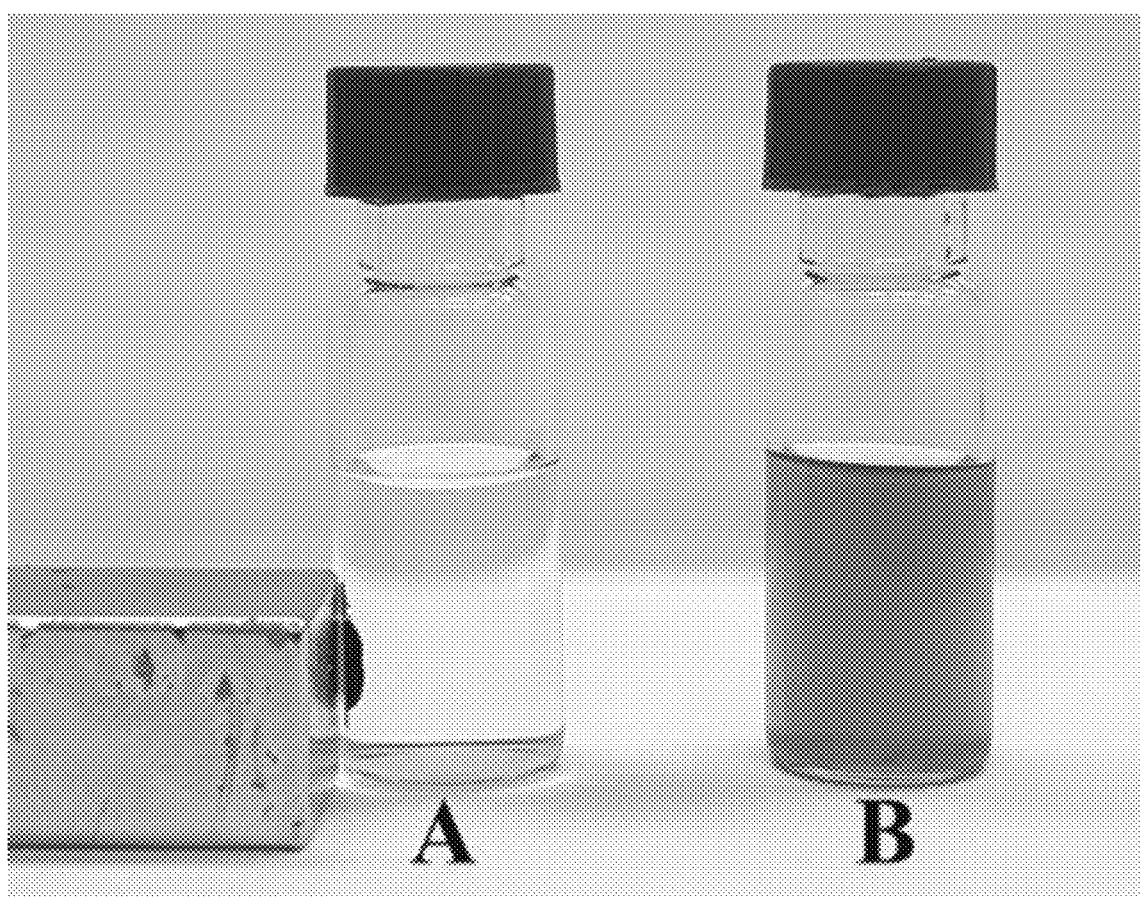
FIG. 9 shows exemplary magnetite nanoparticles (MNP) added to solutions of tetracyclines: in a magnetic field (A) and suspended in the solution (B).
Figure 10:
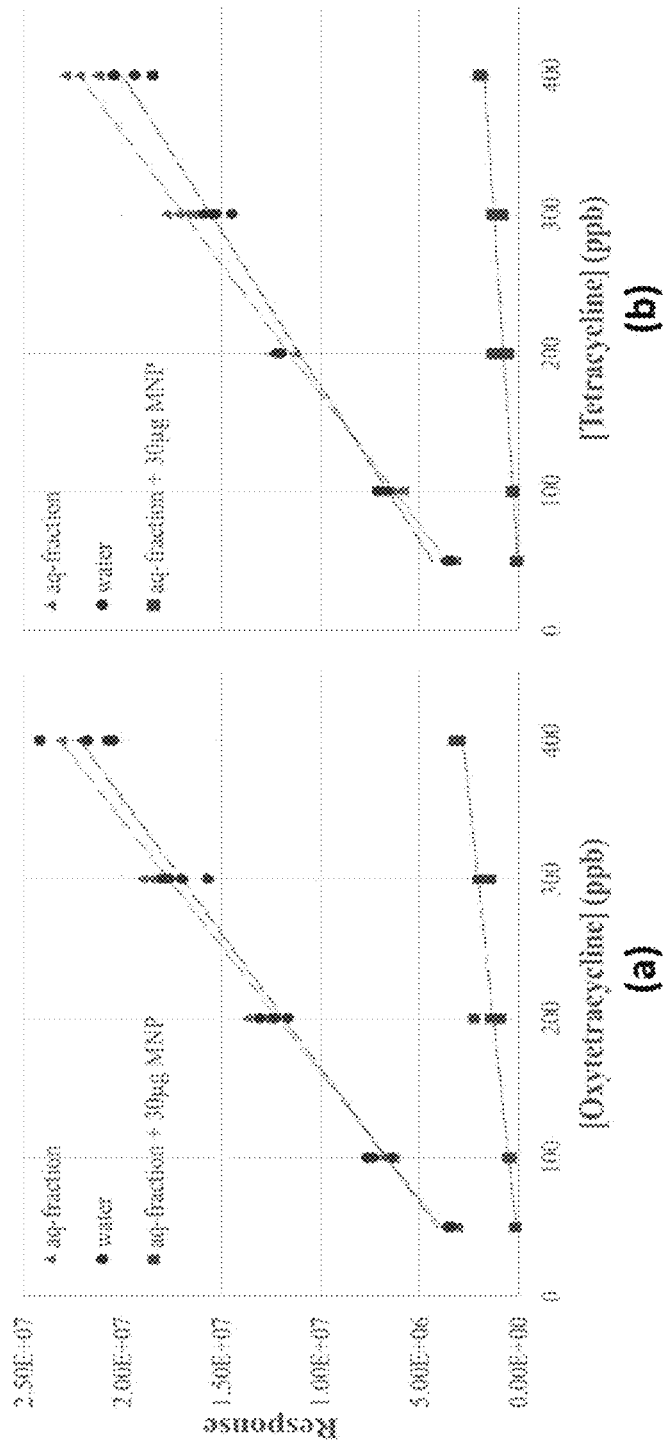
FIG. 10 shows graphs that are calibration curves for (a) oxytetracycline and (b) tetracycline for replicate (n=4) samples at concentrations: 50, 100, 200, 300, and 400 ppb in water and the aqueous fraction shown in FIG. 4 panel d and in the 1 mL aqueous fraction after the addition and extraction with 30 μg exemplary MNP suspension in vial.

Synthesized MNPs were used to selectively extract oxytetracycline (OTC) and tetracycline (TC) in solution as a proof of concept for applications in international food safety initiatives [37]. The exemplary MNPs were magnetically drawn from suspensions in solutions of tetracyclines, after 30 s mixing (FIG. 9). Calibration curves, (FIG. 10), for both OTC and TC, with and without extraction with 30 µg MNPs (100 µL MNP suspension), yield from 83-96% extraction for OTC and 89-97% extraction for TC, for all mass loadings of the tetracyclines. The use of 30 µg MNP extracts ~97% tetracyclines at 200 ppb.

The affinity of tetracyclines to bind to polyvalent metallic cations has been studied [38]. Coordination and absorption of these complexes are considered insoluble or poorly absorbed, which decrease their therapeutic efficacy in biological systems. It has been previously shown (American Chemical Society, Washington, 2017, Analytical challenges and developments for methods required to support regulatory requirements) [39] that iron oxide contaminants from aqueous mobile phase (<0.20 µm) accumulated at the head of UHPLC columns, which selectively interfered with the elution of tetracyclines from a mixture of injected tetracyclines: peak shape, symmetry, and elution time were all impacted. Given the relatively large particle sizes, back flushing the column and using mobile phase free of iron oxides solved the issue. This observation led to the development of a proof of concept for an analytical approach to extract tetracyclines with MNP without surface modification. Complete adsorption profiles for the tetracyclines and MNP mass loadings and surface areas can be obtained by the following methods: 1. varying the concentrations of various compounds of interest in solution and adding one mass loading of MNPs, in quadruplicate. Analyzing the samples before and after addition of MNPs; 2. Maintaining the concentration of various compounds in solution and varying the mass loading of MNPs, in quadruplicate. Analyzing the solutions before and after the addition of MNPs. 3. Changing the contact times, temperatures, agitation rates and mixtures of potentially competitive compounds, example fats, proteins, carbohydrates.

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

TABLE 1

Particle size analyses from transmission electron microscopy (TEMs) of syntheses from an iron salt solution (3.8 mM and 2:1 $Fe^{2+}$:$Fe^{3+}$) with varying % v/v [$NH_{3(g)}$] headspace.

| [$NH_{3(g)}$], % v/v | n | Mean (nm) | Median (nm) | S | ±1 S, % | Kurtosis | Skewness |
|---|---|---|---|---|---|---|---|
| 1.6 | 587 | 12.8 | 12.3 | ±3.7 | 70 | 0.7 | 0.6 |
| 3.3 | 457 | 12.9 | 12.6 | ±3.0 | 67 | 0.2 | 0.5 |
| 8.4 | 563 | 12.9 | 12.5 | ±3.5 | 70 | 1.0 | 0.8 |

FULL CITATIONS FOR DOCUMENTS REFERRED TO IN THE APPLICATION

A number of publications are cited herein. Full citations for these references are provided below. Each of these references is incorporated herein by reference in its entirety into the present disclosure, to the same extent as if each individual reference was specifically and individually indicated to be incorporated by reference.

1. Zhou, L.; Yuan, J.; Yuan, W.; Sui, X.; Wu, S.; Li, Z.; Shen, D. Synthesis, characterization, and controllable drug release of pH-sensitive hybrid magnetic nanoparticles. *J. Magn. Magn. Mater.* 2009, 321, 2799-2804.
2. Yang, J.; Park, S. B.; Yoon, H. G.; Huh, Y. M.; Haam, S. Preparation of poly ε-caprolactone nanoparticles containing magnetite for magnetic drug carrier. *Int. J. Pharm.* 2006, 324, 185-190.
3. Jain, T. K.; Morales, M. A.; Sahoo, S. K.; Leslie-Pelecky, D. L.; Labhasetwar, V. Iron oxide nanoparticles for sustained delivery of anticancer agents. *Mol. Pharm.* 2005, 2, 194-205.
4. Javed, Y.; Akhtar, K.; Anwar, H.; Jamil, Y. MRI based on iron oxide nanoparticles contrast agents: Effect of oxidation state and architecture. *J. Nanopart. Res.* 2017, 19, 366.
5. Corot, C.; Robert, P.; Idée, J. M.; Port, M. Recent advances in iron oxide nanocrystal technology for medical imaging. *Adv. Drug Deliv. Rev.* 2006, 58, 1471-1504.
6. Bruck, A. M.; Cama, C. A.; Gannett, C. N.; Marschilok, A. C.; Takeuchi, E. S.; Takeuchi, K. J. Nanocrystalline iron oxide based electroactive materials in lithium ion batteries: The critical role of crystallite size, morphology, and electrode heterostructure on battery relevant electrochemistry. *Inorg. Chem. Front.* 2016, 3, 26-40.
7. Katz, E. Synthesis, Properties and Applications of Magnetic Nanoparticles and Nanowires—A Brief Introduction. *Magnetochemistry* 2019, 5, 61.
8. Shipley, H. J.; Engates, K. E.; Guettner, A. M. Study of iron oxide nanoparticles in soil for remediation of arsenic. *J. Nanopart. Res.* 2011, 13, 2387-2397.
9. Gaiani, G.; O'Sullivan, C. K.; Campas, M. Magnetic Beads in Marine Toxin Detection: A Review. *Magnetochemistry* 2019, 5, 62.
10. Cecchin, I.; Reddy, K. R.; Thomé, A.; Tessaro, E. F.; Schnaid, F. Nanobioremediation: Integration of nanoparticles and bioremediation for sustainable remediation of chlorinated organic contaminants in soils. *Int. Biodeterior. Biodegrad.* 2017, 119, 419-428.
11. Sarcletti, M.; Vivod, D.; Luchs, T.; Rejek, T.; Portilla, L.; Willer, L.; Dietrich, H.; Hirsch, A.; Zahn, D.; Halik, M. Superoleophilic Magnetic Iron Oxide Nanoparticles for Effective Hydrocarbon Removal from Water. *Adv. Funct. Mater.* 2019, 29, 1-7.
12. Huang, Y. F.; Wang, Y. F.; Yan, X. P. Amine-functionalized magnetic nanoparticles for rapid capture and removal of bacterial pathogens. *Environ. Sci. Technol.* 2010, 44, 7908-7913.
13. Wu, W.; Wu, Z.; Yu, T.; Jiang, C.; Kim, W. S. Recent progress on magnetic iron oxide nanoparticles: Synthesis, surface functional strategies and biomedical applications. *Sci. Technol. Adv. Mater.* 2015, 16, 23501.
14. Zhang, D.; Fakhrullin, R. F.; Ozmen, M.; Wang, H.; Wang, J.; Paunov, V. N.; Li, G.; Huang, W. E. Functionalization of whole-cell bacterial reporters with magnetic nanoparticles. *Microb. Biotechnol.* 2011, 4, 89-97.
15. Ahn, T.; Kim, J. H.; Yang, H. M.; Lee, J. W.; Kim, J. D. Formation pathways of magnetite nanoparticles by coprecipitation method. *J. Phys. Chem. C* 2012, 116, 6069-6076.
16. Wu, S.; Sun, A.; Zhai, F.; Wang, J.; Xu, W.; Zhang, Q.; Volinsky, A. A. $Fe_3O_4$ magnetic nanoparticles synthesis from tailings by ultrasonic chemical co-precipitation. *Mater. Lett.* 2011, 65, 1882-1884.
17. Abou-Hassan, A.; Dufrêchfer, J. F.; Sandre, O.; Mériguet, G.; Bernard, O.; Cabuil, V. Fluorescence confocal laser scanning microscopy for pH mapping in a coaxial flow microreactor: Application in the synthesis of superparamagnetic nanoparticles. *J. Phys. Chem. C* 2009, 113, 18097-18105.
18. Laurent, S.; Forge, D.; Port, M.; Roch, A.; Robic, C.; Elst, L. V.; Muller, R. N. Magnetic iron oxide nanoparticles: Synthesis, stabilization, vectorization, physicochemical characterizations, and biological applications. *Chem. Rev.* 2008, 108, 2064-2110.
19. Tronc, E.; Belleville, P.; Jolivet, J. P.; Livage, J. Transformation of ferric hydroxide into spinel by Fe(II) adsorption. *Langmuir* 1992, 8, 313-319.
20. Jolivet, J.; Chanéac, C.; Tronc, E. Iron oxide chemistry. From molecular clusters to extended solid networks. *Chem. Commun.* 2004, 98, 477-483.
21. Lee, S. J.; Jeong, J. R.; Shin, S. C.; Kim, J. C.; Kim, J. D. Synthesis and characterization of superparamagnetic maghemite nanoparticles prepared by coprecipitation technique. *J. Magn. Magn. Mater.* 2004, 282, 147-150.
22. Mo, Z.; Zhang, C.; Guo, R.; Meng, S.; Zhang, J. Synthesis of $Fe_3O_4$ nanoparticles using controlled ammonia vapor diffusion under ultrasonic irradiation. *Ind. Eng. Chem. Res.* 2011, 50, 3534-3539.
23. Mamani, J. B.; Gamarra, L. F.; De Souza Brito, G. E. Synthesis and characterization of $Fe_3O_4$ nanoparticles with perspectives in biomedical applications. *Mater. Res.* 2014, 17, 542-549.
24. Petrushevska, M.; Pavlovska, K.; Laskova, J.; Zdravkovski, P.; Dodov, M. G. Transmission Electron Microscopy: Novel Application of Established Technique in Characterization of Nanoparticles as Drug Delivery Systems. *Prilozi* 2019, 40, 67-72.
25. Habila, M. A.; Alothman, Z. A.; El-Toni, A. M.; Labis, J. P.; Soylak, M. Synthesis and application of $Fe_3O_4@SiO_2@TiO_2$ for photocatalytic decomposition of organic matrix simultaneously with magnetic solid phase extraction of heavy metals prior to ICP-MS analysis. *Talanta* 2016, 154, 539-547.
26. Farrell, D.; Majetich, S. A.; Wilcoxon, J. P. Preparation and characterization of monodisperse Fe nanoparticles. *J. Phys. Chem. B* 2003, 107, 11022-11030.
27. Mourdikoudis, S.; Pallares, R. M.; Thanh, N. T. K. Characterization techniques for nanoparticles: Comparison and complementarity upon studying nanoparticle properties. *Nanoscale* 2018, 10, 12871-12934.
28. Mandavi, M.; Namvar, F.; Bin Ahmad, M.; Mohamad, R. Green biosynthesis and characterization of magnetic iron oxide ($Fe_3O_4$) nanoparticles using seaweed (*Sargassum muticum*) aqueous extract. *Molecules* 2013, 18, 5954-5964.
29. Kim, W.; Suh, C. Y.; Cho, S. W.; Roh, K. M.; Kwon, H.; Song, K.; Shon, I. J. A new method for the identification and quantification of magnetite-maghemite mixture using conventional X-ray diffraction technique. *Talanta* 2012, 94, 348-352.
30. Silva, V. A. J.; Andrade, P. L.; Silva, M. P. C.; Bustamante, A. D.; De Los Santos Valladares, L.; Albino Aguiar, J. Synthesis and characterization of Fe$_3$O$_4$ nanoparticles coated with fucan polysaccharides. *J. Magn. Magn. Mater.* 2013, 343, 138-143.
31. Alibeigi, S.; Vaezi, M. R. Phase transformation of iron oxide nanoparticles by varying the molar ratio of Fe$^{2+}$: Fe$^{3+}$. *Chem. Eng. Technol.* 2008, 31, 1591-1596.
32. Petcharoen, K.; Sirivat, A. Synthesis and characterization of magnetite nanoparticles via the chemical co-precipitation method. *Mater. Sci. Eng. B Solid State Mater. Adv. Technol.* 2012, 177, 421-427.
33. Singh, H.; Yadav, K. L. Structural, dielectric, vibrational and magnetic properties of Sm doped BiFeO$_3$ multiferroic ceramics prepared by a rapid liquid phase sintering method. *Ceram. Int.* 2015, 41, 9285-9295.
34. Dar, M. I.; Shivashankar, S. A. Single crystalline magnetite, maghemite, and hematite nanoparticles with rich coercivity. *RSC Adv.* 2014, 4, 4105-4113.
35. Kolen'Ko, Y. V.; Bañobre-López, M.; Rodriguez-Abreu, C.; Carbo-Argibay, E.; Sailsman, A.; Piñeiro-Redondo, Y.; Cerqueira, M. F.; Petrovykh, D. Y.; Kovnir, K.; Lebedev, O. I.; et al. Large-scale synthesis of colloidal Fe$_3$O$_4$ nanoparticles exhibiting high heating efficiency in magnetic hyperthermia. *J. Phys. Chem. C* 2014, 118, 8691-8701.
36. He, X.; Zhong, W.; Au, C. T.; Du, Y. Size dependence of the magnetic properties of Ni nanoparticles prepared by thermal decomposition method. *Nanoscale Res. Lett.* 2013, 8, 1-10.
37. Jiang, H. L.; Li, N.; Cui, L.; Wang, X.; Zhao, R. S. Recent application of magnetic solid phase extraction for food safety analysis. *TrAC Trends Anal. Chem.* 2019, 120, 115632.
38. Neuvonen, P. J. Interactions with the Absorption of Tetracyclines. *Drugs* 1976, 11, 45-54.
39. Chemical, A.; National, S. 254*th American Chemical Society National Meeting and Exposition;* 2017, American Chemical Society, Washington D. C., U.S.A.; ISBN 2022494016.

The invention claimed is:

1. A method of preparing magnetite (Fe$_3$O$_4$) nanoparticles comprising:
   establishing a gas-liquid reaction interface between an ammonia gas (NH$_{3(g)}$) headspace and an aqueous ferrous (Fe$^{2+}$) and ferric (Fe$^{3+}$) iron salts solution having a total iron salts concentration of greater than 1 mM and less than 10 mM, in a reaction vessel; and
   without agitation forming the magnetite (Fe$_3$O$_4$) nanoparticles,
   wherein the ammonia gas headspace comprises a steady concentration of ammonia gas produced by delivering ammonia gas into the headspace of the reaction vessel at a rate of about 10 mL/min to about 50 mL/min, and
   wherein the magnetite nanoparticles are spherical magnetite nanoparticles.

2. The method of claim 1, wherein the total iron salts concentration is greater than 1 mM to about 9 mM, greater than about 1 mM to about 8 mM, greater than about 1 mM to about 7 mM, greater than about 1 mM to about 6 mM, greater than about 1 mM to about 5 mM or greater than about 1 mM to about 4 mM.

3. The method of claim 2, wherein the total iron salts concentration is about 3.8 mM.

4. The method of claim 1, wherein the iron salt solution has a molar ratio of 1.75:1 to 2.25:1 ferrous (Fe$^{2+}$) iron salt to ferric (Fe$^{3+}$) iron salt.

5. The method of claim 1, wherein the ammonia gas (NH$_{3(g)}$) headspace is produced by delivering ammonia gas into the headspace of the reaction vessel at a constant rate.

6. The method of claim 1, wherein the ammonia gas (NH$_{3(g)}$) headspace comprises a concentration of ammonia gas of about 2.0% (v/v), about 3.0% (v/v), about 4.0% (v/v), about 5.0% (v/v), about 6.0% (v/v), about 7.0% (v/v), about 8.0% (v/v), or about 9.0% (v/v).

7. The method of claim 6, wherein the concentration of the ammonia gas is about 1.6% (v/v), about 3.3% (v/v), or about 8.4% (v/v).

8. The method of claim 1, wherein method is performed at room temperature.

9. The method of claim 1, wherein the method further comprises placing the reaction vessel on a magnet.

10. The method of claim 1, wherein the magnetite nanoparticles are formed in less than about 90 minutes or about 90 minutes.

11. The method of claim 1, wherein the method provides magnetite nanoparticles having an average particle size of about 10 nm to about 20 nm.

12. The method of claim 1, wherein the method provides magnetite nanoparticles having an average particle size of about 11 nm to about 13 nm.

13. The method of claim 1 wherein the method provides the magnetite nanoparticles in an overall yield of greater than about 99%, greater than 99.5% or greater than 99.9%.

14. The method of claim 1, wherein method provides the magnetite nanoparticles in an overall yield greater than about 99.9% or about 99.9%.

15. The method of claim 1, wherein the method provides magnetite nanoparticles that are phase pure.

16. The method of claim 1, wherein the magnetite nanoparticles are formed at the gas-liquid reaction interface.

17. The method of claim 2, wherein the total iron salts concentration is greater than about 1 mM to about 4 mM.

18. The method of claim 11, wherein the method provides magnetite nanoparticles having an average particle size of about 10 nm to about 15 nm.

19. The method of claim 1, wherein the ammonia gas is delivered in an inert gas diluent.

20. The method of claim 1, wherein the inert gas diluent is nitrogen gas.

* * * * *